US011969753B2

(12) United States Patent
Becker et al.

(10) Patent No.: US 11,969,753 B2
(45) Date of Patent: Apr. 30, 2024

(54) PROCESS FOR PRODUCING MATT COATINGS ON SHEETLIKE SUBSTRATES

(71) Applicant: BASF SE, Ludwigshafen am Rhein (DE)

(72) Inventors: Axel Becker, Ludwigshafen (DE); Sebastian Berger, Ludwigshafen (DE); Stefanie Stein, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 1109 days.

(21) Appl. No.: 16/637,071

(22) PCT Filed: Aug. 15, 2018

(86) PCT No.: PCT/EP2018/072088
§ 371 (c)(1),
(2) Date: Feb. 6, 2020

(87) PCT Pub. No.: WO2019/034675
PCT Pub. Date: Feb. 21, 2019

(65) Prior Publication Data
US 2023/0256468 A1 Aug. 17, 2023

(30) Foreign Application Priority Data
Aug. 16, 2017 (EP) .................... 17186474

(51) Int. Cl.
*B05D 3/06* (2006.01)
*C09D 163/10* (2006.01)
*C09D 167/07* (2006.01)
*C09D 171/00* (2006.01)

(52) U.S. Cl.
CPC ........... *B05D 3/067* (2013.01); *C09D 163/10* (2013.01); *C09D 167/07* (2013.01); *C09D 171/00* (2013.01)

(58) Field of Classification Search
CPC ..... C09D 163/10; C09D 167/07; B05D 3/067
See application file for complete search history.

(56) References Cited

U.S. PATENT DOCUMENTS

| 4,411,931 | A | 10/1983 | Duong | |
|---|---|---|---|---|
| 6,100,316 | A * | 8/2000 | Lobert | ................. C09D 175/14 522/104 |
| 9,073,082 | B2 | 7/2015 | Fischer et al. | |
| 9,512,322 | B2 | 12/2016 | Buckmann et al. | |
| 2010/0196822 | A1 * | 8/2010 | Sasaki | ................... G03F 7/0382 430/280.1 |
| 2013/0129980 | A1 | 5/2013 | Meinhard et al. | |
| 2013/0131268 | A1 * | 5/2013 | Buckmann | ............... C09D 4/00 427/532 |
| 2014/0371384 | A1 * | 12/2014 | Fischer | .................. B05D 3/067 524/556 |

FOREIGN PATENT DOCUMENTS

| CN | 102161862 A | 8/2011 |
|---|---|---|
| CN | 102770496 A | 11/2012 |
| DE | 4439350 A1 | 4/1996 |
| DE | 19842510 A1 | 3/2000 |
| DE | 102006042063 A1 | 3/2008 |
| EP | 2418019 A1 | 2/2012 |
| EP | 2703092 A1 | 3/2014 |
| WO | 2012013364 A1 | 2/2012 |
| WO | 2013092521 A1 | 6/2013 |

OTHER PUBLICATIONS

English translation of International Search Report for International Application No. PCT/EP2018/072088, dated Nov. 14, 2018, 2 pages.
Schubert et al., Farbe + Lack 117/5 (2011), pp. 21-25. Cited in specification, no English translation available.
Bauer et al., Progress in Org. Coatings 69 (2010), pp. 287-293.
Bauer et al., Progress in Org. Coatings 64 (2009), pp. 474-481.

* cited by examiner

*Primary Examiner* — Robert A Vetere
(74) *Attorney, Agent, or Firm* — Armstrong Teasdale LLP

(57) ABSTRACT

The present disclosure relates to a process for producing matt coatings on sheetlike substrates. The method includes providing an uncured lacquer layer of a UV radiation-curable liquid lacquer formulation F on a surface of the substrate to be coated. The method also includes irradiating the lacquer layer with UV radiation substantially in the wavelength range of 250 to 420 nm with a radiation dose which results in partial curing of the lacquer layer. The method further includes irradiating the partially cured lacquer layer with UV radiation in the wavelength range of 150 to <250 nm under inert gas. The method further includes irradiating the partially cured lacquer layer with UV radiation substantially in the wavelength range of 250 to 420 nm or with electron radiation with a radiation dose which results in end-curing of the lacquer layer.

19 Claims, No Drawings

PROCESS FOR PRODUCING MATT COATINGS ON SHEETLIKE SUBSTRATES

CROSS-REFERENCE TO RELATED APPLICATIONS

This application is a U.S. National Phase Application of PCT/EP2018/072088, filed Aug. 15, 2018, which claims the benefit of priority to EP Application No. 17186474.7, filed Aug. 16, 2017, the contents of which are hereby expressly incorporated by reference in their entirety.

The present invention relates to a method for producing matt coatings on sheetlike substrates, especially on nonporous substrates, such as wood, woodbase materials, metals, and plastics, using liquid compositions which are curable by UV radiation.

The use of coating systems which are cured by exposure to actinic radiation (known as beam-curable or radiation-curable coating systems) is a long-established technology for the production of high-grade coatings. An overview is found for example in P. Glöckner et al. "Radiation Curing for Coatings and Printing Inks", Vincentz Network GmbH, Hannover 2008. Coating systems of this kind comprise liquid formulations which comprise oligomers or polymers having a plurality of ethylenically unsaturated double bonds, frequently in the form of acryloyl groups ($CH_2$=CH—C(O)— groups), and, optionally, ethylenically unsaturated monomers of low molecular mass. To produce the coatings, the liquid coatings are applied to the substrate surface to be coated, and the resultant coating film is subsequently cured by being irradiated with actinic radiation, such as, for example, UV radiation or else electron beams (EB radiation). Under such irradiation, the ethylenically unsaturated double bonds undergo radical polymerization, and a crosslinked polymer film is formed.

One embodiment of radiation-curable coating systems are formulations wherein substantially all of the constituents, i.e., at least 80 wt %, more particularly at least 90 wt %, of the constituents of the formulation undergo crosslinking by radical polymerization. These coating systems typically contain no unpolymerizable volatile constituents (VOCs) and are also referred to as 100% systems. A further embodiment of radiation-curable coating systems are aqueous formulations wherein those constituents which form the coating are present in emulsified form. When these formulations are employed, the actual curing by irradiation is preceded by physical drying in order to remove the water and volatile constituents from the "wet coating film" that results when the formulation is applied. Common to both types of formulation is that the coating film to be cured consists to an extent of at least 80 wt %, more particular at least 90 wt %, based on the total mass of the constituents of this coating film, of the constituents which crosslink by radical polymerization on irradiation.

As a result of volatile constituents being largely absent during irradiation, there is little or no reduction in the applied coating film thickness of these coating systems in the course of the curing operation. This minimal contraction results in very smooth surfaces of high gloss and makes it more difficult to produce matt surfaces by simply adding conventional matting agents to the formulation.

There have occasionally been reports of methods in which dully matt surfaces (e.g., gloss <5 GU at 85° angle geometry, determined according to DIN EN ISO 2813:2015-02) are produced by irradiating radiation-curable coating systems with UVC radiation in the wavelength range from 150 to <250 nm, as described for example in DE 19842510. Microcreasing of the coating is generated photochemically by the pretreatment with UVC radiation. This microcreasing is responsible for a dully matt surface. Improved methods based on this principle are described in DE 102006042063 and also by Schubert et al., Farbe+Lack 117/5 (2011), p. 21 ff., Bauer et al., Progress in Org. Coatings 69 (2010), pp. 287-293, and Bauer et al., Progress in Org. Coatings 64 (2009), pp. 474-481. In these cases, microcreasing is generated first of all in the surface of the uncured coating film by irradiation with UVC radiation. This is followed by through curing of the coating film beneath the creased surface using conventional UV emitters such as, for example, medium-pressure mercury emitters or electron beam emitters. The aforesaid methods can only be used, however, to produce dully matt surfaces of low gloss. In particular, it is not possible in this way to produce coatings with glosses of more than 10 GU at the 60° angle geometry, as determined according to DIN EN ISO 2813:2015-02.

WO 2013/092521 describes a method for producing uniformly matted coatings based on radiation-curable coating systems. With this method, a 100% coating formulation, so called, is first applied to the surface of the substrate that is to be coated. This wet coating film is subsequently irradiated with UV light with a wavelength of 200 to 420 nm and a radiation dose of 25 to 120 mJ/cm$^2$, to give a partially gelled coating film. This film is then irradiated successively with UVC light with a wavelength of 120 to 230 nm and is subsequently cured fully using actinic radiation.

Again, the aforesaid method leads only to dully matt surfaces of low gloss and, moreover, is confined to coatings having thicknesses of more than 20 μm.

For many areas of application, the desire is for matt surfaces of these kinds to have a soft or warm or velvety tactility, i.e., what is called a soft touch effect. The matt surfaces produced on the basis of radiation-curable coating systems, however, typically have a hard surface which feels cold to the touch, and are therefore unsatisfactory as far as the soft touch effect is concerned. The soft sensation on contact with a surface is critically dependent on the area of contact and hence the transmission of heat between skin and surface. A general rule which may be postulated is that the smaller the area of contact, the greater the sensation of touching a velvety surface.

There is therefore a need for coating methods based on radiation-curable coating systems that lead to matt coatings with an adjustable soft touch effect. There is need, furthermore, for coating methods which allow the provision of coatings which have higher glosses than dully matt coatings and in particular exhibit a gloss of at least 10 GU at 65° angle geometry. In particular there is a need for coating methods based on 100% systems, so called, since in these cases the matting and a soft touch effect are particularly difficult to achieve.

It has surprisingly been found that by means of the method described in more detail below, matt surfaces can be produced that have relatively high glosses, up to the point of satin gloss, and/or have appealing tactility. More particularly it has been found that the establishment of an appealing tactility is possible when at least one of the following features (A), (B) and/or (C) is fulfilled:

(A) the number of ethylenically unsaturated double bonds in the coating formulation, based on the coating-forming constituents present in the coating formulation F, is in the range from 3.0 to 8.0 mol/kg, more particularly in the range from 3.0 to 6.5 mol/kg;

(B) the coating formulation F comprises at least one oligomer or polymer in an amount of at least 30 wt %, more particularly at least 40 wt %, based on the curable constituents of the coating formulation, and in the case of the oligomer and/or polymer or of a mixture thereof, the ratio of network arc length a to the onset temperature $T_o$ in kelvins of the glass transition, determined by means of differential scanning calorimetry according to DIN EN ISO 11357-2:2014, i.e., the ratio $\alpha/T_o$, is at least 1.2; and/or (C) the mass-average ratio $\alpha/T_o$, averaged over the weight fractions of all curable constituents of the coating formulation F, is at least 1.0, preferably at least 1.1, more particularly at least 1.2.

It has further surprisingly been found that the gloss of matt coatings can be controlled, and degrees of gloss higher than dully matt obtained, if the coating formulation comprises at least one aromatic epoxy acrylate in an amount of at least 20 wt %, especially at least 30 wt %, and very especially at least 40 wt %, based on the total weight of the curable constituents present in the coating formulation.

The present invention relates accordingly to a method for producing matt coatings on sheetlike substrates that comprises the successive steps i.-iv. specified below:

i. providing an uncured coating film of a liquid coating formulation F, curable by UV radiation, on the surface of the substrate to be coated;

ii. irradiating the coating film with UV radiation which lies substantially in the wavelength range from 250 to 420 nm, with a radiation dose which leads to partial curing of the coating film;

iii. irradiating the partially cured coating film with UV radiation in the wavelength range from 150 to <250 nm under inert gas;

iv. irradiating the coating film with UV radiation which lies substantially in the wavelength range from 250 to 420 nm, or with electron beams, with a radiation dose which leads to full curing of the coating film;

wherein the coating formulation F consists to an extent of at least 80 wt %, based on the total weight of the coating-forming constituents of the coating formulation F, of one or more curable constituents which have ethylenically unsaturated double bonds, the coating formulation F further comprising at least one photoinitiator, and the coating formulation F comprising at least one oligomer or polymer which carries on average at least 1.5, more particularly at least 1.8, ethylenic double bonds per molecule and having a number-average molecular weight $M_n$ of at least 450 daltons, preferably as principal constituent of the curable constituents, with the proviso that the coating formulation F fulfills at least one of the following features (A), (B), (C) or (D):

(A) the number of ethylenically unsaturated double bonds, based on the coating-forming constituents present in the coating formulation F, is in the range from 3.0 to 8.0 mol/kg, more particularly in the range from 3.0 to 6.5 mol/kg;

(B) the coating formulation F comprises at least 30 wt %, more particularly at least 40 wt %, based on the curable constituents present therein, of an oligomer or polymer or of a mixture of oligomers and/or polymers wherein the ratio $\alpha/T_o$ of calculated network arc length $\alpha$ in g/mol to the onset temperature $T_o$ in kelvins of the glass transition, determined by means of differential scanning calorimetry according to DIN EN ISO 11357-2: 2014, i.e. the ratio $\alpha/T_o$, is at least 1.2, preferably at least 1.3, more particularly at least 1.5, and especially at least 1.7;

(C) the mass-average ratio $\alpha/T_o$, averaged over the weight fractions of all curable constituents of the coating formulation F, is at least 1.0, preferably at least 1.1, more particularly at least 1.2;

(D) the coating formulation F comprises at least one aromatic epoxy acrylate in an amount of at least 20 wt %, more particularly in an amount of at least 30 wt %, and especially in an amount of at least 40 wt %, based on the total weight of the curable constituents present in the coating formulation F.

Whereas features (A), (B), and (C), on their own or particularly in combination, are responsible for appealing tactility, i.e., an effect known as the soft touch effect, feature (D) in particular leads to coatings having relatively high glosses, particularly if the coating formulation F further comprises at least one matting agent.

The method of the invention allows the desired tactility of matt coatings to be established, via features (A), (B), and (C) in conjunction with the sequence of irradiation steps ii) to iv), without any need to accept reductions in the mechanical stability and chemical resistance of the surface. In this connection, in particular, lower values in feature (A), and also higher values in features (B) and (C), lead to matt surfaces having a softer tactility, whereas higher values in feature (A) and/or lower values in features (B) and (C) result in a less soft tactility. Here and below, the softness of the tactility is also referred to as soft touch. A strong soft touch effect is synonymous with a very soft tactility. The extent of the soft touch effect correlates with the sliding friction on a slanting plane in that a high sliding friction represents a strong soft touch effect. To determine the sliding friction on a slanting plane, a glass plate is coated with the coating formulation and the coating is cured fully by UV radiation. Then a defined weight, of 1 kg, for example, cylindrical with a base diameter of 5 cm, and coated on the contact area (e.g., 20 $cm^2$) with a slip-promoting film (e.g., an adhesive label from Avery of functional form 3425), is placed onto the glass plate (18*32 cm), and a determination is made of the height of inclination at which the weight starts to slide.

The method of the invention also allows the production not only of dully matt coatings with glosses GU(60° of less than 5, but also of coatings with higher glosses, i.e., glosses GU(60° of more than 5, more particularly of at least 10 GU(60°, up to, for example, satin-gloss coatings with a gloss GU(60° of 70. The gloss GU is understood here and below to be the degree of gloss GU measured in reflection geometry according to DIN EN ISO 2813:2015-02. The gloss is measured typically at a reflection angle of 20°, 60° or 85° and is stated correspondingly as gloss GU for the angle in question. The gloss GU(60° therefore relates to the gloss measured at an angle of 60°. The gloss here is successfully adjusted in particular by feature (D) in conjunction with the sequence of irradiation steps ii) to iv). The rule here is that higher fractions of aromatic epoxy acrylate, based on the curable constituents in the coating formulation F, lead to higher glosses, without any need to accept reductions in the mechanical stability of the surface.

The network arc length $\alpha$ is understood here and below as the ratio of the number-average molecular weight $M_n$ divided by the average functionality of the oligomer, i.e., by the average number of ethylenically unsaturated double bonds per oligomer molecule. Accordingly, the network arc length a is expressed in g/mol. The average number of ethylenically unsaturated double bonds of the oligomers may be determined by $^1$H-NMR spectrometry, for example. The number-average molecular weight of the oligomers can be determined in a manner known per se by gel permeation chromatography according to DIN 55672-1:2016-03 using polystyrene as standard and tetrahydrofuran as mobile phase.

The onset temperature of the glass transition is the temperature which, in a thermogram measured by means of differential scanning calorimetry according to DIN EN ISO 11357-2:2014 with a heating rate of 10 k/min, indicates the lower temperature of the glass transition and which is determined by extrapolation of the thermogram in accordance with DIN EN ISO 11357-2:2014.

Unless otherwise indicated, the term "principal constituent", in relation to the curable constituents present in the coating formulation F, means that the constituent thus identified, or the mixture of constituents thus identified, accounts for at least 40 wt %, more particularly at least 50 wt %, of those constituents of the coating formulation F which have ethylenically unsaturated double bonds and are therefore curable constituents.

The term "constituents which form the coating" encompasses all constituents of the coating formulation F which remain in the coating when the coating film is fully cured. These constituents are, in principle, all constituents of the coating formulation F which are not water or nonpolymerizable, volatile solvents.

The term "curable constituents" encompasses all constituents of the coating formulation F which have ethylenically unsaturated double bonds and therefore form a polymeric network when the coating film is fully cured.

In relation to steps ii. and iv., the expression "UV radiation which lies substantially in the wavelength range from X to Y nm (e.g., 250 to 420 nm)" means that the predominant radiant output, more particularly at least 80% and especially at least 90% of the radiant output, of the radiation source used is produced by UV radiation within the stated wavelength range X to Y nm (e.g., 250 to 420 nm).

The term "double bond functionality" refers to the average number (number average) of polymerizable ethylenic double bonds per molecule.

The term "(meth)acrylic" encompasses not only acrylic but also methacrylic groups. The term "(meth)acrylate", accordingly, encompasses the terms acrylate and methacrylate.

The coating formulations F used in the method of the invention comprise at least 80 wt %, more particularly at least 85 wt %, e.g., 80 to 99.9 wt %, more particularly 85 to 99.5 wt %, based on the total weight of the coating-forming constituents present in the coating formulation F, of curable constituents, i.e., substances which have ethylenically unsaturated double bonds. The substances which have ethylenically unsaturated double bonds may be oligomers or polymers or else monomers. Whereas oligomers and polymers typically have a number-average molecular weight $M_n$ of at least 450 g/mol, more particularly at least 500 g/mol, in the range, for example, from 450 to 10 000 g/mol and especially in the range from 500 to 10 000 g/mol, the number-average molecular weight $M_n$ of the monomers is below 450 g/mol and is typically in the range from 100 to 400 daltons.

The curable constituents here are generally selected such that the coating formulation F comprises at least 2.0 mol, more particularly at least 2.5 mol, and especially at least 3.0 mol, e.g., 2.0 to 8.0 mol, more particularly 2.5 to 7.5 mol, and especially 3.0 to 7.0 mol, of ethylenically unsaturated double bonds per kg of the coating-forming constituents present in the coating formulation F.

The ethylenically unsaturated double bonds of the curable constituents of the coating formulation F are customarily in the form of acrylic groups, methacrylic groups, allyl groups, fumaric acid groups, maleic acid groups and/or maleic anhydride groups, more particularly to an extent of at least 90% or 100%, based on the total amount of the ethylenically unsaturated double bonds present in the coating formulation F, in the form of acrylic or methacrylic groups, and especially in the form of acrylic groups. The acrylic and methacrylic groups may be in the form of (meth)acrylamide or (meth)acrylate groups, the latter being preferred. More particularly the curable constituents of the coating formulation F have acrylate groups to an extent of at least 90% or 100%, based on the total amount of the ethylenically unsaturated double bonds present in the coating formulation F.

In accordance with the invention, the coating formulation F comprises at least one oligomer or polymer which has ethylenically unsaturated double bonds and has on average a double bond functionality of at least 1.5, more particularly at least 1.8. The oligomers and/or polymers of the coating formulation F preferably have a double bond functionality in the range from 1.5 to 10, more particularly in the range from 1.8 to 8.5, i.e., the number of ethylenically unsaturated double bonds per oligomer or polymer molecule is on average in the range from 1.5 to 10 and more particularly in the range from 1.8 to 8.5. Also suitable are mixtures of different oligomers with different functionalities, in which case the average double bond functionality is preferably in the range from 1.5 to 10, more particularly in the range from 1.8 to 8.5.

The oligomers and/or polymers typically have a linear or branched scaffold which carries the ethylenically unsaturated double bonds, preferably in the form of the aforementioned acrylic groups and more particularly in the form of acrylate groups, with the ethylenically unsaturated double bonds able to be bonded to the scaffold via a linker, or being part of the scaffold. Suitable oligomers and polymers are, in particular, oligomers and polymers from the group of the polyethers, polyesters, melamine resins, silicone resins, polyurethanes, polycarbonates, and epoxy resins.

In particular the oligomers and polymers are selected from polyether (meth)acrylates, i.e., polyethers having acrylic groups and/or methacrylic groups, polycarbonate (meth)acrylates, i.e., polycarbonates having acrylic groups and/or methacrylic groups, polyester (meth)acrylates, i.e., polyesters having acrylic groups and/or methacrylic groups, epoxy (meth)acrylates, i.e., reaction products of polyepoxides with hydroxyl-, amino- or carboxyl-functionalized (meth)acrylic compounds, urethane (meth)acrylates, i.e., oligomers and polymers which have a (poly)urethane scaffold and acrylic groups and/or methacrylic groups, examples being reaction products of polyisocyanates with hydroxyl- or amino-functionalized acrylic compounds. Also suitable are unsaturated polyester resins, i.e., polyesters which have a plurality of ethylenically unsaturated double bonds, present preferably in the polymer scaffold, examples being condensation products of itaconic acid, maleic acid or fumaric acid and their anhydrides with aliphatic diols or polyols, and mixtures thereof.

Suitable polyether (meth)acrylates are, in particular, polyether acrylates, especially those having on average 1.8 to 6 acrylate groups. Examples thereof are the Laromer® products P033F, P043F, LR8863, P09034, GPTA, P08967, P08982, P09007, P09062, and PPTTA from BASF SE; AgiSyn® products 701, 702, 703, 2836, 2837, 2844, 2858, 2867, 2869, and 2897 from DSM Coating Resins B.V.; Ebecryl® products 40, 160, and OTA480 from Allnex S.a.r.l.; Etermer® EM products 2380, 2381, 2382, 2383, 2384, 2385, 2386, 2387, 2411, 2421, and 3380 from Eternal Chemical Co., Ltd.; Miramer® products 320, 360, 3130, 3150, 3160, 3190, and 4004 from Miwon Specialty Chemical Co., Ltd.; Sanmu® E03-TMPTA from Jiangsu Sanmu Group Corporation; Sartomer® SR products 415, 454, 492, 494, 499, 502, 593, 9008, 9012, 9019, 9020, 9020HP, and 9035, Sartomer® CN products 435, and Sartomer® CD products 501 and 9021 from Sartomer, the aforementioned products in some cases being blends with monomers. Preferred among these are aliphatic polyether acrylates, more particularly those which are obtainable by esterification of C2-C4-alkoxylated polyols with acrylic acid. Particularly preferred are aliphatic polyether acrylates whose number-average molecular weight $M_n$ is in the range from 500 to 4000 g/mol.

Particularly suitable polyester meth(acrylates) are polyester acrylates, especially those having on average 1.8 to 6 acrylate groups. Examples thereof are the Laromer® PE products 55F, 56F, 46T, 8800, 8907, 8981, 9004, 9024, 9032, 9045, 9074, 9079, 9084, 9105, 9121, 9123, 9125, 9126, 9127, 9128, 9129, 9142, and 9155 from BASF SE; Ebecryl® products 140, 154, 170, 411, 411, 436, 437, 438, 446, 450, 452, 524, 525, 546, 570, 571, 575, 657, 770, 800, 810, 811, 812, 820, 830, 837, 846, 851, 852, 853, 854, 859, 870, 873, 884, 885, 892, 894, 898, 1657, 1870, 4266, 4744, 4764, 5781, 5849, and 10801 from Allnex S.a.r.l.; AgiSyn® products 705, 706, 710, 720, 730, and 740 from DSM Coating Resins B.V.; the Etercure® products DR-E 503, DR-E 514, DR-E 532, DR-E 572, DR-E 577, DR-E 601, DR-E 602, 6078, 6237, 6311, 6312, 6313, 6314, 6315, 6316, 6317, 6319, 6320, 6321, 6323, 6327, 6332, 6333, 6340, 6341, 6342, 6343, 6351, 6353, 6355, 6358, 6360, 6361, and 6362 from Eternal Chemical Co. Ltd.; the Photomer® products 4771, 4775, 4967, 5006, 5010, 5041, 5050, 5428, 5429, 5432, 5434, 5435, 5443, and 5450 from IGM Resins B.V.; the Miramer® products Miramer PE 220, Miramer P 261, Miramer P 261, Miramer PS, 60, Miramer PS 643, Miramer PS 1000, Miramer SC 1010, Miramer SC 1020, Miramer P 2229, Miramer WS 2601, Miramer PS 3010, Miramer PS 3214, Miramer PS 3220, Miramer PS 4040, Miramer PS 4500, Miramer S 5257, Miramer PS 6300, and Miramer PS 6400 and the Photomer® products Photocryl P 302 and Photocryl DP 344 from Miwon Specialty Chemical Co., Ltd.; the Qualipoly® GU products GU2168Z, GU2169Z, GU8400C, GU8400X, GU8436C, GU8436X, GU8500C, GU8540C, GU8703D, GU9315Z, GU9400Y, GU9600Y, GU9600Z, GU9700D, GU9700Y, GU9700Z, GU9900Y, GU9900Z, and GU9900W from Qualipoly Chemical Corporation; the Genomer® products 3485, 3611, and 7227 from Rahn AG; and the Sartomer® CN products 203, 204, 210, 225, 292, 293, 294, 296, 298, 298, 704, 710, 736, 738, 750, 790, 1007, 2100, 2101, 2200, 2201, 2203, 2204, 2205, 2250, 2251, 2252, 2253, 2255, 2256, 2257, 2258, 2259, 2260, 2261, 2262, 2266, 2270, 2271, 2273, 2274, 2276, 2279, 2281, 2282, 2295, 2297, 2505, 2540, 2555, 2560, 2800, 2881, 2900, 2901, and 2902 from Sartomer, the aforementioned products in some cases being blends with monomers. Preferred among these aliphatic polyester acrylates. Particularly preferred are aliphatic polyester acrylates whose number-average molecular weight $M_n$ is in the range from 500 to 4000 g/mol.

Particularly suitable urethane (meth)acrylates are urethane acrylates, more particularly oligomers and polymers containing urethane groups, having on average 1.8 to 10, more particularly 1.9 to 8.5 acrylate groups, and being obtainable preferably by reaction of aromatic or aliphatic di- or oligoisocyanates with hydroxyalkyl acrylates. Examples thereof are the Laromer® products UA19T, UA9028, UA9030, UA8987, UA9029, UA9033, UA9047, UA9048, UA9050, UA9072, UA9065, UA9089, UA9073, and UA9136 from BASF SE; the Neorad® U products 10, 20, 25, 42, 60, 61, 6282, and 6288 from DSM Coating Resins B.V.; the AgiSyn® products 230, 236, 250, and 670 from DSM Coating Resins B.V.; the Ebecryl® products 204, 205, 206, 210, 214, 215, 220, 221, 230, 244, 245, 246, 264, 265, 267, 270, 271, 280, 284, 285, 286, 294, 1258, 1290, 1290, 1291, 2002, 2003, 2221, 4101, 4150, 4201, 4220, 4250, 4265, 4396, 4491, 4501, 4510, 4513, 4587, 4654, 4666, 4680, 4683, 4740, 4765, 4820, 4858, 4859, 5021, 5129, 6202, 8100, 8110, 8210, 8213, 8215, 8232, 8254, 8296, 8301, 8307, 8310, 8311, 8402, 8405, 8413, 8415, 8465, and 8602 from Allnex S.a.r.l.; Etercure® products 611, 615, 6072, 6081, 6101, 6112, 6113, 6114, 6115, 6120, 6121, 6122, 6123, 6127, 6130, 6131, 6134, 6141, 6142, 6143, 6144, 6145, 6145, 6146, 6147, 6148, 6148, 6149, 6150, 6151, 6152, 6153, 6153, 6154, 6154, 6157, 6158, 6160, 6161, 6164, 6165, 6170, 6171, 6172, 6175, 6175, 6175, 6176, 6181, 6195, 6196, 6197, 6198, 8000, Etercure DR-U 6-1, Etercure DR-U 10, Etercure DR-U 11, Etercure DR-U 20, Etercure DR-U 21, Etercure DR-U 22, Etercure DR-U 24, Etercure DR-U 25, Etercure DR-U 26, Etercure DR-U 57, Etercure DR-U 91, Etercure DR-U 92, Etercure DR-U 95, Etercure DR-U 106, Etercure DR-U 116, Etercure DR-U 300, Etercure DR-U 301 from Eternal Chemical Co. Ltd.; the Photomer® products 6008, 6009, 6010, 6019, 6184, 6210, 6230, 6625, 6628, 6690, 6720, 6891, 6892, and 6893 from IGM Resins B.V., the Miramer® products 256, 307, 320, 340, 360, 375, 610, 620, 622, 662, 664, 2012, 2030, 2100, 2152, 2200, 2404, 2410, 2421, 2510, 2560, 2564, 2565, 2900, 3100, 3195, 3201, 3280, 3304, 3400, 3420, 3440, 3450, 3600, 3603, 3701, 3710, 3722, 4100, 4150, 5000, 5216, 6140, and 9800 from Miwon Specialty Chemical Co., Ltd.; the Genomer® products 1122, 4188, 4205, 4215, 4217, 4256, 4267, 4269, 4297, 4302, 4312, 4316, 4425, 4590, and 4622 from Rahn AG; the Sartomer® CN products 902, 910, 914, 916, 922, 925, 929, 936, 944, 945, 945, 945, 956, 959, 961, 961, 962, 963, 963, 963, 963, 964, 965, 966, 967, 968, 970, 971, 972, 973, 975, 976, 977, 978, 980, 981, 982, 983, 984, 985, 989, 990, 991, 992, 994, 996, 997, 998, 999, 1963, 3000, 3001, 8000, 8001, 8002, 8003, 9001, 9002, 9004, 9007, 9010, 9014, 9026, 9101, 9102, 9130, 9143, 9165, 9167, 9170, 9196, 9200, 9245, 9245, 9250, 9251, 9260, 9276, 9278, 9293, 9761, 9782, 9783, 9788, 9800, and 9893 from Sartomer; the Qualicure® GU products GU3001Z, GU3010Z, GU3030Z, GU3100W, GU3100Y, GU3100Z, GU3185A, GU3185B, GU3285A, GU3290M, GU3300W, GU3300Z, GU3370A, GU3400Y, GU3400Z, GU3501Q, GU4000Y, GU4075B, GU4100Y, GU4175X, GU4200Z, GU4280B, GU4300Y, GU4500Y, GU6100L, GU6200Y, GU6200Z, GU6300Y, GU6370F, GU7200Z, GU7400Z, GU7500Z, GU3680A, GU3700Y, GU3701W, GU3775A, GU3980A, GU4660A, GU4900Y, GU6600Y, and GU7900Z and the Qualicure® GS products GS4920C and GS5120C from Qualipoly Chemical Corporation, the aforementioned products in some cases being blends with monomers. Preferred among these aliphatic urethane acrylates. Particularly preferred are aliphatic urethane acrylates whose number-average molecular weight $M_n$ is in the range from 500 to 4000 g/mol.

Suitable epoxy (meth)acrylates are, in particular, aromatic epoxy (meth)acrylates, especially aromatic epoxy acrylates. Examples of epoxy acrylates are, in particular, the reaction products of aliphatic polyglycidyl ethers with acrylic acid or with hydroxy-functionalized acrylic compounds, and also the reaction products of aromatic polyglycidyl ethers with acrylic acid or with hydroxy-functionalized acrylic compounds. The concept of polyglycidyl ethers encompasses diglycidyl ethers of aliphatic or aromatic diols and also oligomers which are obtained by reaction of diglycidyl ethers with dihydric or higher polyhydric alcohols and which as well as epoxy groups also have esterifiable hydroxyl groups. Suitable hydroxy-functionalized acrylic compounds are, in particular, hydroxyalkyl acrylates, examples being hydroxyethyl acrylate, hydroxypropyl acrylate, or hydroxybutyl acrylate. The polyglycidyl ethers that are used for preparing the epoxy acrylates typically have on average 2 to 4 glycidyl groups per molecule and may also have 1 to 4 esterifiable hydroxyl groups. Preferred epoxy acrylates are aromatic epoxy acrylates. Preferred among these are the reaction products of polyglycidyl ethers based on novolacs, and the reaction products of polyglycidyl ethers based on bisphenols, as for example based on bisphenol A or bisphenol F. Preferred among these are the reaction products of aromatic polyglycidyl ethers, especially of those based on novolacs or based on bisphenols such as bisphenol A or bisphenol F, with acrylic acid and/or hydroxyalkyl acrylates. Particularly preferred are aromatic epoxy acrylates whose number-average molecular weight $M_n$ is in the range from 500 to 4000 g/mol. Particularly preferred are aromatic epoxy acrylates which have on average 1.9 to 5, especially 2 to 4, acrylate groups. Examples of these are the Laromer® products LR8765 (aliphatic), LR8986, LR9019, LR9023, EA9081, EA9082, EA9097, EP9124, EA9138, EA9143 and EA9145, EA9148 from BASF SE; the AgiSyn® products 1010, 1030, 2020, 3010, 3020, 3051, 9720, 9721, 9750, 9760, 9771, 9790, and 9792 from DSM Coating Resins B. V.; the Ebecryl® products 113, 600, 604, 605, 608, 609, 640, 641, 648, 860, 1606, 1608, 3105, 3203, 3300, 3416, 3420, 3608, 3639, 3700, 3700, 3701, 3702, 3703, 3708, 3730, 3740, 5848, and 6040 from Allnex S.a.r.l.; the Etercure® products 621, 621, 622, 622, 623, 623, 624, 624, 625, 923, 6209, 6210, 6211, 6213, 6215, 6219, 6231, 6233, 6233, 6234, 6235, 6241, 6261, and 620 from Eternal Chemical Co. Ltd.; the Photomer® products 3005, 3015, 3016, 3072, 3316, 3317, 3620, and 3660 from IGM; the Miramer® and Photocryl® products Miramer PE 110 H, Photocryl E 202, Photocryl E 203/30PE, Photocryl E 207/25TP, Photocryl E 207/30PE, Photocryl E 07/25HD, Miramer PE 210, Miramer PE 210 HA, Miramer PE 230, Miramer PE 250, Miramer PE 250 LS, Photocryl DP 296, Miramer PE 310, Photocryl DP 460, Miramer PE 2100, Miramer PE 2120 A, Miramer PE 2120 C, Miramer PE 2120 B, Miramer PE 130, Miramer ME 2500, Miramer SC 6345, and Miramer SC 6400 from Miwon Specialty Chemical Co., Ltd.; the Genomer® products 2235, 2253, 2255, 2259, 2263, and 2280 from Rahn AG; the Sartomer® CN and Kyrarad® products Sartomer CN 104 Y50, Sartomer CN 108, Sartomer CN 109, Sartomer CNUVE 110/95, Sartomer CN 111, Sartomer CN 112 B70, Sartomer CN 12 C60, Sartomer CN 113 D70, Sartomer CNUVE 114/95, Sartomer CN 115, Sartomer CN 116, Sartomer CN 116 D50, Sartomer CN 117, Sartomer CN 118, Sartomer CN 119, Sartomer CN 120, Sartomer CN 120 A75, Sartomer CN 120 A80, Sartomer CN 120 B60, Sartomer CN 120 B80, Sartomer CN 120 C60, Sartomer CN 120 C80, Sartomer CN 120 D80, Sartomer CN 120 E50, Sartomer CN 120 J90, Sartomer CN 120 M50, Sartomer CN 120 S80, Sartomer CN 121, Sartomer CN 122 A80, Sartomer CN 124, Sartomer CN 129, Sartomer CNUVE 130, Sartomer CN 131 B, Sartomer CN 132, Sartomer CN 133, Sartomer CN 136, Sartomer CN 148, Sartomer CNUVE 150/80, Sartomer CN 151, Sartomer CNUVE 151, Sartomer CN 152, Sartomer CN 56, Sartomer CN 159, Sartomer CN 173, Sartomer CN 186, Kayarad R 190, Kayarad R 205, Kayarad TCR 1094, Kayarad TCR 1096, Sartomer CN 1300, Sartomer CN 2003 EU, Kayarad EAM 2160, and Kayarad EAM 2300 from Sartomer, and the Qualicure® GU products GU1160C, GU1200W, GU1280A, GU1380A, GU1400Z, GU1475A, GU1480A, GU1600Y, GU1650X, GU1700W, GU1700P, GU1700T, GU1700Y, GU1700Z, GU1800W, GU1900W, and GU1900Z from Qualipoly Chemical Corporation, the aforementioned products in some cases being blends with monomers.

Suitable aliphatic polycarbonate (meth)acrylates are, in particular, polycarbonate acrylates, especially those having a number-average molecular weight $M_n$ in the range from 600 to 3000 g/mol and an average double bond functionality in the range from 2 to 15 double bonds per molecule, more particularly 2 to 10 double bonds per molecule. Aliphatic polycarbonate (meth)acrylates of this kind are known, from WO 2016/186728, for example, or may be prepared by reaction of OH-terminated, aliphatic polycarbonates with acrylic acid or ester-forming acrylic acid compounds, e.g. (meth)acryloyl chloride or $C_1$-$C_4$ alkyl (meth)acrylate, such as methyl acrylate or ethyl acrylate, under esterification or transesterification conditions, respectively.

In one group of embodiments of the invention, the coating formulation F comprises at least one oligomer or polymer selected from urethane (meth)acrylates, polyester (meth)acrylates, polycarbonate (meth)acrylates, polyether (meth)acrylates, and mixtures thereof, and also, optionally, one or more monomers. Preferred among these are those coating formulations F in which the oligomers and/or polymers selected from urethane (meth)acrylates, polyester (meth)acrylates, polycarbonate (meth)acrylates, polyether (meth)acrylates, and mixtures thereof make up the principal constituent of the coating-forming constituents, in other words at least 50 wt % and more particularly at least 60 wt % of said constituents. Preferred within this group of embodiments are those coating formulations F in which the oligomers and/or polymers are selected from aliphatic urethane acrylates, aliphatic polyester acrylates, aliphatic polyether acrylates, aliphatic polycarbonate acrylates, and mixtures thereof.

In a further group of embodiments of the invention, the coating formulation F comprises at least one oligomer or polymer which is selected from epoxy acrylates, more particularly from aromatic epoxy acrylates. The epoxy acrylate may be the sole oligomer or polymer or may be a mixture with one or more different oligomers or polymers. Further oligomers and polymers are selected in particular from urethane acrylates, polyester acrylates, polyether acrylates, polycarbonate acrylates, and mixtures thereof, especially from aliphatic urethane acrylates, aliphatic polyester acrylates, aliphatic polyether acrylates, aliphatic polycarbonate acrylates, and mixtures thereof. In this group of embodiments, the coating formulation F comprises at least one aromatic epoxy acrylate, preferably in an amount of at least 20 wt %, more particularly at least 30 wt %, more preferably at least 40 wt %, or at least 50 wt %, based on the total mass of the coating-forming constituents present in the coating formulation F.

Besides the oligomers or polymers containing ethylenically unsaturated double bonds, the crosslinkable constituents of the coating formulation F may comprise one or more monomers which are also referred to as reactive diluents. The monomers typically have molecular weights of below 450 g/mol, in the range from 100 to 400 g/mol, for example. Suitable monomers generally have 1 to 6, more particularly 2 to 4, ethylenically unsaturated double bonds per molecule.

These ethylenically unsaturated double bonds are preferably in the form of the aforesaid acrylic groups, methacrylic groups, allyl groups, fumaric acid groups, maleic acid groups and/or maleic anhydride groups, itaconic acid groups, more particularly in the form of acrylic or methacrylic groups, and especially present as acrylate groups.

Preferred monomers are selected from esters of acrylic acid with mono- to hexahydric, more particular mono- to tetrahydric aliphatic or cycloaliphatic alcohols, which may optionally be ethoxylated or propoxylated and which preferably have 2 to 20 carbon atoms, such as, for example

- monoesters of acrylic acid with mono- or difunctional alcohols, e.g., with $C_1$-C20 alkanols, benzyl alcohol, furfuryl alcohol, tetrahydrofurfuryl alcohol, (5-ethyl-1,3-dioxan-5-yl)methanol, phenoxy ethanol, cyclic trimethylolpropane formal, 1,4-butanediol or with 4-tert-butylcyclohexanol;
- diesters of acrylic acid with di- or trifunctional alcohols, e.g., with ethylene glycol, 1,3-propanediol, 1,2-propanediol, 1,4-butanediol, neopentyl glycol, ethoxylated neopentyl glycol, 1,6-hexanediol, diethylene glycol, triethylene glycol, dipropylene glycol or with tripropylene glycol;
- triesters of acrylic acid with tri- or tetrafunctional alcohols, e.g., with glycerol, propoxylated glycerol, trimethylolpropane, ethoxylated trimethylolpropane, propoxylated trimethylolpropane, trimethylolpropane with mixed ethoxylation and propoxylation, or with pentaerythritol (ethoxylated or propoxylated) or ditrimethylolpropane;
- the tetraesters of acrylic acid with tetra- or hexafunctional alcohols, e.g., with pentaerythritol, ditrimethylolpropanes or with ethoxylated pentaerythritol;
- the pentaesters of acrylic acid with hexafunctional alcohols, e.g., with dipentaerythritol, isosorbide, or with ethoxylated and/or propoxylated dipentaerythritol or isosorbide; and also
- the hexaester of acrylic acid with hexafunctional alcohols, e.g., with dipentaerythritol, isosorbide, or with ethoxylated and/or propoxylated dipentaerythritol or isosorbide.

Examples of suitable monomers are, in particular, trimethylolpropane diacrylate, trimethylolpropane triacrylate, ethylene glycol diacrylate, butanediol diacrylate, hexanediol diacrylate, dipropylene glycol diacrylate, tripropylene glycol diacrylate, phenoxyethyl acrylate, furfuryl acrylate, tetrahydrofurfuryl acrylate, 4-tert-butylcyclohexyl acrylate, 4-hydroxybutyl acrylate, and trimethylol formal monoacrylate ((5-ethyl-1,3-dioxan-5-yl)methyl acrylate), the triester of acrylic acid with trimethylolpropane ethoxylated with 2 to 4 mol of ethylene oxide, the diester of acrylic acid with neopentyl glycol ethoxylated with 1-3 mol of ethylene oxide, and the diester of acrylic acid with neopentyl glycol propoxylated with 1 to 3 mol of propylene oxide.

In coating formulations F of the invention, the curable constituents that are present in the coating formulation F generally comprise at least 40 wt %, more particularly at least 45 wt %, especially at least 50 wt %, based on the total amount of curable constituents, of one or more oligomers and/or polymers which have ethylenically unsaturated double bonds and on average a double bond functionality of at least 1.5, more particularly at least 1.8, as for example 1, 2, 3 or 4 oligomers or polymers, more particularly 1, 2, 3 or 4 of the oligomers or polymers stated as being preferred. The fraction of the monomers in that case, correspondingly, is not more than 60 wt %, more particularly not more than 55 wt %, especially not more than 50 wt %, based on the total amount of curable constituents of the coating formulation F.

In coating formulations F which comprise one or more monomers, the oligomer and/or the polymer preferably forms the principal constituent of the curable constituents of the composition, meaning that the oligomers account for at least 40 wt %, more particularly at least 50 wt %, especially at least 55 wt %, based on the total amount of oligomer and/or polymers and monomer, e.g., 40 to 99 wt %, more particularly 50 to 98 wt % or 55 to 98 wt %, based on the total amount of oligomer and/or polymers and monomer. The weight ratio of the total amount of oligomers and/or polymers to the total amount of monomer is then in particular in the range from 1:1 to 100:1 and especially in the range from 1.2:1 to 50:1.

In other coating formulations F likewise in accordance with the invention, the curable constituents present in the coating formulation F comprise exclusively or almost exclusively, i.e., at least 90 wt %, more particularly at least 95 wt %, especially at least 99 wt %, based on the total amount of curable constituents, of one or more oligomers, e.g., 1, 2, 3 or 4 oligomers or polymers, more particularly 1, 2, 3 or 4 of the oligomers or polymers stated as being preferred. The fraction of the monomers in that case, correspondingly, is not more than 10 wt %, more particularly not more than 5 wt %, especially not more than 1 wt % or is 0 wt %, based on the total amount of curable constituents of the coating formulation F.

The coating formulations F typically have a dynamic viscosity at 23° C. in the range from 5 mPa*s to 500 Pa*s, more particularly in the range from 20 mPa*s to 100 Pa*s, and especially in the range from 50 mPa*s to 10 Pa*s, determined according to DIN 53019:2008-05 by means of a cone-and-plate viscometer at a shear rate of 200 to 10 000 s$^{-1}$ (10 000 s$^{-1}$ at 0-1 Pa*s, 2500 s$^{-1}$ at 1-4 Pa*s, 800 s$^{-1}$ at 4-12.5 Pa*s, and 200 s$^{-1}$ at >12.5 Pa*s).

Besides the curable constituents of the coating formulation F, the coating formulations F comprise at least one photoinitiator. Photoinitiators are understood as substances which on exposure to UV radiation, i.e., to light with a wavelength of below 420 nm, more particularly below 410 nm, break down to form radicals and so trigger polymerization of the ethylenically unsaturated double bonds. Such photoinitiators typically have at least one absorption band with a maximum in the range from 220 to 420 nm, more particularly in the range from 230 to 410 nm, this band being coupled with the initiation of the breakdown process. In particular, such photoinitiators have at least one absorption band with a maximum $\lambda_{max}$ in the range from 220 to 420 nm, more particularly a maximum in the range from 230 to 410 nm.

Examples of suitable photoinitiators are alpha-hydroxyalkylphenones and alpha-dialkoxyacetophenones such as 1-hydroxycyclohexyl phenyl ketone, 2-hydroxy-2-methyl-1-phenyl-1-propanone, 2-hydroxy-1-{4-[4-(2-hydroxy-2-methylpropionyl)benzyl]phenyl}-2-methylpropan-1-one, 2-hydroxy-1-[4-(2-hydroxyethoxy)phenyl]-2-methyl-1-propanone or 2,2-dimethoxy-1-phenylethanone;

phenylglyoxalic esters such as methyl phenylglyoxalate;

benzophenones such as benzophenone, 2-hydroxybenzophenone, 3-hydroxybenzophenone, 4-hydroxybenzophenone, 2-methylbenzophenone, 3-methylbenzophenone, 4-methylbenzophenone, 2,4-dimethylbenzophenone, 3,4-dimethylbenzophenone, 2,5-dimethylbenzophenone, 4-benzoylbiphenyl, or 4-methoxybenzophenone;

benzil derivates such as benzil, 4,4'-dimethylbenzil, and benzil dimethyl ketal;

benzoins such as benzoin, benzoin ethyl ether, benzoin isopropyl ether, and benzoin methyl ether;

acylphosphine oxides such as 2,4,6-trimethylbenzoyldiphenylphosphine oxide, ethoxy(phenyl)phosphoryl-(2,4,6-trimethylphenyl)methanone, and bis(2,4,6-trimethylbenzoyl)phenylphosphine oxide;

titanocenes such as the product sold under the name Irgacure® 784 by BASF SE;

oxime esters such as the product sold under the name Irgacure® OXE01 and OXE02 by BASF SE;

alpha-aminoalkylphenones such as 2-methyl-1-[4-(methylthio)phenyl-2-morpholinopropan-1-one, 2-(4-methylbenzyl)-2-dinnethylannino-1-(4-morpholinophenyl)-1-butanone or 2-benzyl-2-dinnethylannino-1-(4-morpholinophenyl)-1-butanone.

Preferred photoinitiators are in particular selected from the groups of the alpha-hydroxyalkylphenones, alpha-dialkoxyacetophenones, phenylglyoxalic esters, benzophenones, benzoins, and acylphosphine oxides.

The coating formulations F preferably comprise at least one photoinitiator I which has an absorption band with a maximum $\lambda_{max}$ in the range from 340 to 420 nm and especially in the range from 350 to 410 nm. These photoinitiators I may be sole photoinitiators in the coating formulations F. In preferred embodiments of the invention, the coating formulations F comprise not only the photoinitiator I but also, preferably, at least one further photoinitiator II which has an absorption band with a maximum $\lambda_{max}$ in the range from 220 to 340 nm and especially in the range from 230 to 320 nm. In that case the weight ratio of photoinitiator I to photoinitiator II is preferably in the range from 5:1 to 1:20.

Preferred photoinitiators I which have an absorption band having a maximum $\lambda_{max}$ in the range of 340 to 420 nm and especially in the range from 350 to 410 nm are the aforesaid acylphosphine oxides.

Preferred photoinitiators II which have an absorption band having a maximum $\lambda_{max}$ in the range from 220 to 340 and especially in the range from 230 to 320 nm are the aforesaid alpha-hydroxyalkylphenones, alpha-dialkoxyacetophenones, phenylglyoxalic esters, benzophenones, and benzoins.

The total amount of photoinitiators is typically in the range from 0.1 to 10 wt %, more particularly 0.2 to 5 wt %, based on the total weight of the curable constituents of the coating formulation F.

The coating formulations F may further comprise one or more matting agents which produce an additional matting effect and/or a homogenization of the surface structure. These include, for example, silicon dioxides, such as fumed silica and synthetic amorphous silica, e.g., precipitated silica, and also zinc soaps, e.g., zinc stearate. The total amount of matting agent will generally not exceed 10 wt %, based on the total weight of the curable constituents of the coating formulations F, and, where present, is typically in the range from 0.1 to 10 wt % and more particularly in the range from 0.5 to 5 wt %, based on the total weight of the curable constituents in the coating formulation F.

The coating formulations F may further comprise one or more noncurable resins which are compatible with the constituents of the coating formulation, i.e., which dissolve in the constituents of the coating formulation. These resins produce a reduction in the volume contraction and so allow a leveling of the gloss properties, for example. These resins are also referred to as inert resins. The uncurable resins include, in particular, aldehyde condensation resins, examples being urea-formaldehyde condensation resins, and polyamide resins. The total amount of uncurable resins will generally not exceed 10 wt %, based on the total weight of the curable constituents of the coating formulations F, and, where present, is typically in the range from 0.1 to 10 wt % and more particularly in the range from 0.5 to 5 wt %, based on the total weight of the curable constituents in the coating formulation F.

The coating formulations F may further comprise one or more waxes, in particular micronized waxes which bring about an improvement in the resistance properties, particularly the scratch resistance, and/or the sliding friction. Such waxes typically have particle sizes in the range from 0.1 to 10 μm (d50 values, determined by light scattering). The total amount of waxes will generally not exceed 5 wt %, based on the total weight of the curable constituents of the coating formulations F, and, where present, is typically in the range from 0.05 to 5 wt % and more particularly in the range from 0.1 to 2 wt %, based on the total weight of the curable constituents in the coating formulation F.

The coating formulations F may further comprise one or more inorganic fillers. These include, in particular, micronized phyllosilicates such as micronized kaolin and micronized magnesium silicates. Such fillers typically have particle sizes in the range from 0.1 to 10 μm (d50 values, determined by light scattering). The total amount of inorganic fillers will generally not exceed 10 wt %, based on the total weight of the curable constituents of the coating formulations F, and, where present, is typically in the range from 0.1 to 5 wt % and more particularly in the range from 0.2 to 3 wt %, based on the total weight of the curable constituents in the coating formulation F.

In addition, the coating formulations F may comprise one or more further additives. Examples of suitable additives are light stabilizers, such as UV absorbers and reversible radical scavengers (HALS), antioxidants, deaerating agents, wetting agents, emulsifiers, slip additives, polymerization inhibitors, adhesion promoters, flow control agents, film-forming assistants, rheological assistants, such as thickeners and what are called "sag control agents" (SCAs) with structural viscosity, flame retardants, corrosion inhibitors, siccatives, and biocides. These and further suitable constituents are described in the textbook "Lackadditive" [Additives for coatings] by Johan Bieleman, Wiley-VCH, Weinheim, N.Y., 1998, and in D. Stoye and W. Freitag (Editors), "Paints, Coatings and Solvents", Second, Completely Revised Edition, Wiley-VCH, Weinheim, New York, 1998, "14.9. Solvent Groups", pages 327 to 373.

The coating formulations F may also be pigmented. In that case they preferably comprise at least one pigment from the group of organic and inorganic pigments, as for example from the group of transparent, hiding, coloring and/or effect-imparting and also electrically conductive pigments. The coating formulations F preferably contain no pigments.

The nonaqueous coating formulations F may also comprise one or more organic solvents. Suitable organic solvents are inert toward the functional groups present in the coating material, from the time of addition up to the end of the process, and contain no ethylenically unsaturated double bonds. Suitable examples are solvents used in coating technology such as hydrocarbons, alcohols, ketones, and esters, e.g., toluene, xylene, isooctane, acetone, butanone, methyl isobutyl ketone, ethyl acetate, butyl acetate, tetrahydrofuran, N-methylpyrrolidone, dimethylacetamide, dimethylformamide. Such solvents account preferably for not more than 10 wt %, more particularly not more than 5 wt %. The coating formulations preferably contain no such organic solvents.

The coating formulations F may be designed as aqueous OW emulsions, comprising the curable constituents of the coating formulations F and, optionally, further constituents in emulsified form. The fraction of curable constituents in the emulsion is typically in the range from 10 to 50 wt %, based on the total weight of the coating formulation F.

The coating formulations F are preferably designed as nonaqueous coating formulations, which consist to an extent of at least 80 wt %, more particularly at least 90 wt %, based on the total weight of the coating formulation F, of one or more curable constituents which have ethylenically unsaturated double bonds. Preferably these systems are what are called 100% systems, meaning that all or virtually all of the constituents of the coating formulation F are different from water and volatile solvents and other volatile constituents and therefore remain in the coating when the coating film is cured.

For the production of matt surfaces having a soft tactility, it has proven advantageous if the coating formulations F have at least one of the features (A), (B), and (C). Accordingly, a first group 1 of embodiments of the invention relates to a method wherein coating formulations F are employed which have at least one of the features (A), (B), and (C), more particularly the features (A) and (B) or (A) and (C), and especially all features (A), (B), and (C). The coating formulations F of group 1 may also have the feature (D). In a subgroup 1a of embodiments of the invention, the coating formulations F of group 1 do not have feature (C). In a subgroup 1 b of embodiments of the invention, the coating formulations F of group 1 have feature (D).

Where the coating formulations F have feature (A), the curable constituents are selected such that the number of ethylenically unsaturated double bonds, based on the coating-forming constituents present in the coating formulation F, is in the range from 3.0 to 8.0 mol/kg, more particularly in the range from 3.0 to 6.5 mol/kg. The number of ethylenically unsaturated double bonds may be verified in a conventional way via the relative proportions of the oligomers, polymers, and monomers, and also via the double bond content, which is easy to determine for these species. The number of double bonds in the formulation, or in the coating-forming constituents, and also the double bond content in the oligomers, polymers, and monomers used for the formulation or constituents, can be determined in a conventional way, as for example by $^1$H-NMR, and also titrimetrically via the bromine number or the iodine number.

Where the coating formulations F have feature (B), the coating formulations comprise at least one oligomer and/or polymer in an amount of at least 30 wt %, more particularly at least 40 wt %, based on the total amount of the curable constituents of the respective coating formulation F. For this oligomer or polymer, the ratio $\alpha/T_o$ has a value of at least 1.2, preferably at least 1.3, more particularly at least 1.5, and especially at least 1.7. The ratio $\alpha/T_o$, which is stated dimensionlessly, has the unit $g*K^{-1}*mol^{-1}$. In general, the ratio $\alpha/T_o$ will not exceed a value of 15.0 and more particularly 12.0 and especially 10.0. Where the coating formulations F comprise a mixture of two or more oligomers and/or polymers having different ratios $\alpha/T_o$, it is in principle sufficient for one of the oligomers and/or polymers to have a ratio $\alpha/T_o$ with the stated values in order to fulfill feature (B), if this oligomer and/or polymer is the principal constituent, based on the total amount of the curable constituents of the respective coating formulation F. Where the coating formulations comprise a mixture of two or more oligomers and/or polymers having different ratios $\alpha/T_o$ and the individual oligomers and/or polymers, not on their own but rather as a mixture, make up at least 30 wt %, more particularly at least 50 wt %, and especially at least 60 wt %, of all curable constituents of the coating formulation F, it is sufficient if the weight average of the individual ratios $\alpha/T_o$ has the value specified for feature (B), in order to fulfill feature (B).

The weight average of the ratio $\alpha/T_o$, hereinafter $\alpha/T_o$ (average), can be calculated according to the following formula (1):

$$\alpha/T_o(\text{average}) = m(1) \cdot \alpha/T_o(1) + m(2) \cdot \alpha/T_o(2) + \ldots m(n) \cdot \alpha/T_o(n) \quad (1)$$

where m(1), m(2), ... and m(n) stand for the mass fractions of the respective oligomers and/or polymers 1, 2 ... n, and $\alpha/T_o(1)$, $\alpha/T_o(2)$, $\alpha/T_o(n)$ stand for the ratios $\alpha/T_o$ of the individual oligomers and/or polymers.

With regard to the generation of a soft touch effect, preferably at least 30 wt %, more particularly at least 40 wt %, more preferably at least 50 wt %, and especially at least 60 wt %, or all, of the oligomers and/or polymers present in the respective coating formulation F have a ratio $\alpha/T_o$ having a value specified for feature (B). The oligomers and/or polymers which have a ratio $\alpha/T_o$ having a value specified for feature (B) preferably make up at least 20 wt %, more particularly at least 30 wt %, and especially at least 40 wt % of the curable constituents of the coating formulation.

Oligomers and/or polymers which have a ratio $\alpha/T_o$ with a value specified for feature (B) preferably have an onset temperature $T_o$ in the range from 180 to 230 K. The network arc length $\alpha$ of such oligomers and/or polymers is preferably in the range from 220 to 3000 g/mol, more particularly in the range from 235 to 2500 g/mol, especially in the range from 255 to 2000 g/mol, and very particularly in the range from 270 to 1500 g/mol.

Examples of oligomers and polymers which have a ratio $\alpha/T_o$ with a value specified for feature (B) are aliphatic urethane acrylates having a number-average molecular weight $M_n$ in the range from 600 to 6000 g/mol and an average functionality in the range from 1.8 to 8.5 double bonds per molecule, more particularly 1.8 to 6.5 double bonds per molecule.

Examples of such oligomers and polymers which have a ratio $\alpha/T_o$ with a value specified for feature (B) are also aliphatic polyether acrylates having a number-average molecular weight $M_n$ in the range from 600 to 1800 g/mol and an average functionality in the range from 1.8 to 6.5 double bonds per molecule, more particularly 1.8 to 5.0 double bonds per molecule.

Examples of such oligomers and polymers which have a ratio $\alpha/T_o$ with a value specified for feature (B) are also aliphatic polyester acrylates having a number-average molecular weight Mn in the range from 600 to 3000 g/mol and an average functionality in the range from 2.0 to 6.5 double bonds per molecule, more particularly 1.8 to 5.0 double bonds per molecule.

Examples of such oligomers and polymers which have a ratio $\alpha/T_o$ with a value specified for feature (B) are also aliphatic polycarbonate acrylates (as described in U.S. Pat. No. 7,649,074 B2, column 16, line 51) having a number-average molecular weight $M_n$ in the range from 600 to 3000 g/mol and an average functionality in the range from 2 to 15 double bonds per molecule, more particularly 2 to 10 double bonds per molecule.

In relation to the generation of a soft touch effect, it has additionally proven useful if the mass-average ratio $\alpha/T_o$ averaged over all of the curable constituents of the coating formulation F, is at least 1.1 and more particularly at least 1.2 (feature (C)). The mass-average ratio $\alpha/T_o$ (mass average) can be calculated according to the following formula (2):

$$\alpha/T_o(\text{mass average}) = w(1) \cdot \alpha/T_o(1) + w(2) \cdot \alpha/T_o(2) + \ldots w(n) \cdot \alpha/T_o(n) \quad (2)$$

where $w(1), w(2), \ldots$ and $w(n)$ stand for the mass fractions of the respective oligomers and/or polymers $1, 2 \ldots n$ as a proportion of the total mass of all curable constituents in the coating formulation F, and $\alpha/T_o(1), \alpha/T_o(2), \ldots \alpha/T_0(n)$ stand for the ratios $\alpha/T_o$ of the individual oligomers and/or polymers.

In groups 1, 1a, and 1b of embodiments it has proven useful if at least 90% or 100%, based on the total amount of ethylenically unsaturated double bonds present in the coating formulation F, are in the form of acrylic or methacrylic groups, more particularly in the form of acrylate or methacrylate groups, and especially as acrylate groups.

Preferred oligomers and polymers of coating formulations F which correspond to groups 1, 1a, and 1b of embodiments are selected from urethane acrylates, polyester acrylates, polyether acrylates, epoxy acrylates, polycarbonate acrylates, and mixtures thereof. In groups 1, 1a, and 1b of embodiments, preference is given to those coating formulations F in which the oligomers and/or polymers are selected from urethane acrylates, polyester acrylates, polyether acrylates, polycarbonate acrylates, and mixtures thereof, and also mixtures of these with aromatic epoxy acrylates, more particularly to those mixtures in which the oligomers and/or polymers selected from urethane acrylates, polyester acrylates, polyether acrylates, polycarbonate acrylates, and mixtures thereof make up at least 50 wt % and more particularly at least 60 wt % of the coating-forming constituents.

Particularly preferred within groups 1, 1a, and 1b of embodiments are those coating formulations F in which the coating formulation F comprises as principal constituent at least one oligomer which is selected from aliphatic urethane acrylates, aliphatic polyether acrylates, aliphatic polyester acrylates, aliphatic polycarbonate acrylates, and mixtures thereof.

Particularly preferred within groups 1, 1a, and 1b of embodiments are those coating formulations F in which the oligomers and/or polymers are selected from aliphatic urethane acrylates, aliphatic polyester acrylates, aliphatic polyether acrylates, aliphatic polycarbonate acrylates, and mixtures thereof, and also mixtures of these with aromatic epoxy acrylates. Especially preferred among these are those mixtures in which the oligomers and/or polymers selected from aliphatic urethane acrylates, aliphatic polyester acrylates, aliphatic polyether acrylates, aliphatic polycarbonate acrylates, and mixtures thereof make up at least 50 wt % and more particularly at least 60 wt % of the coating-forming constituents.

The coating formulations F of groups 1, 1a, and 1b of embodiments may comprise one or more monomers, more particularly the monomers stated above as being preferred, as reactive diluents, in addition to the oligomers and/or polymers. Monomers particularly preferred for this group 1 are those having on average 1 to 4 ethylenically unsaturated groups, especially acrylate groups, per molecule. In these coating formulations F, the oligomer and/or the polymer forms the principal constituent of the curable constituents of the composition, i.e., the oligomer and/or polymer and/or oligomers and/or polymers make up at least 40 wt %, more particularly at least 50 wt %, especially at least 55 wt % or at least 60 wt %, based on the total amount of oligomer and/or polymers and monomer. The weight ratio of the total amount of oligomers and/or polymers to the total amount of monomer is in that case in particular in the range from 1:1 to 100:1 and especially in the range from 1.2:1 to 50:1.

The coating formulations F of groups 1, 1a, and 1b of embodiments preferably comprise at least one photoinitiator I which has an absorption band with a maximum $\lambda_{max}$ in the range from 340 to 420 nm and especially in the range from 350 to 410 nm. In preferred embodiments of groups 1, 1a, and 1b, the coating formulations F comprise not only the photoinitiator I but also, preferably, at least one further photoinitiator II which has an absorption band with a maximum $\lambda_{max}$ in the range from 220 to 340 nm and especially in the range from 230 to 320 nm. In that case the weight ratio of photoinitiator I to photoinitiator II is preferably in the range from 5:1 to 1:20. For the preferred photoinitiators I and II in the coating formulations F of embodiments 1, 1a, and 1b, the statements made above are valid mutatis mutandis. Regarding the amounts of photoinitiators in the coating formulations F of embodiments 1, 1a, and 1b, the statements made above are likewise valid mutatis mutandis.

For the production of matt surfaces with a gloss at 60° of more than 5 GU(60°, it has proven advantageous if the coating formulations F have feature (D). Coating formulations F having feature (D) are also referred to below as group 2 of embodiments. In addition, these coating formulations F may have one or more of features (A), (B), and (C). Accordingly, a second group 2 of embodiments of the invention relates to a method which employs coating formulations F which have feature (D) and optionally one or more of features (A), (B), and (C). The coating formulations F of group 2 preferably also have feature (A). In a subgroup 2a of embodiments of the invention, the coating formulations F of group 2 do not have feature (B). In this subgroup, the coating formulations preferably have feature (C) (subgroup (2aa)). In a subgroup 2b of embodiments of the invention, the coating formulations F of group 2 have features (A), (B), and (D), and optionally (C).

Suitable aromatic epoxy acrylates in the coating formulations F of the group of embodiments 2, 2a, 2aa, and 2b are, in particular, the reaction products of aromatic polyglycidyl ethers with acrylic acid and/or with hydroxy-functionalized acrylic compounds, more particularly with hydroxyalkyl acrylates, as for example with hydroxyethyl acrylate, hydroxypropyl acrylate or hydroxybutyl acrylate. The aromatic polyglycidyl ethers used for the preparation typically have on average 2 to 4 glycidyl groups per molecule. Preferred aromatic polyglycidyl ethers for preparing aromatic epoxy acrylates are polyglycidyl ethers based on novolacs and polyglycidyl ethers based on bisphenols such as bisphenol A or bisphenol F. Preferred among these are the reaction products of aromatic polyglycidyl ethers based on novolacs with hydroxyalkyl acrylates, and also the reaction products of aromatic polyglycidyl ethers based on bisphenols such as bisphenol A or bisphenol F with hydroxyalkyl acrylates and/or acrylic acid. Particularly preferred aromatic epoxy acrylates are those whose number-average molecular weight Mn is in the range from 500 to 4000 g/mol.

The coating formulations F of embodiments 2, 2a, and 2b preferably comprise the aromatic epoxy acrylate in a fraction of at least 40 wt % and especially in an amount of at least 50 wt %, as for example in an amount of 40 to 100 wt %, and especially in an amount of 50 to 90 wt %, based on the total weight of the curable constituents present in the coating formulation F.

The coating formulations F of embodiments 2, 2a, and 2b preferably comprise at least one further constituent, selected from matting agents, particularly silicon dioxide-based matting agents, waxes, and inert resins. The result of this is to obtain better leveling of the surface and hence a more uniform development of the matting effect. The total amount of such further constituents is in the range from 0.2 to 10 wt % and more particularly in the range from 0.3 to 8 wt %, based on the total weight of the curable constituents in the coating formulation F. With regard to the proportions of the respective further constituents, the comments made above are valid particularly for the coating formulations F of embodiments 2, 2a, 2aa, and 2b as well.

In accordance with the invention, in the first step i., the coating formulation F is provided in the form of an uncured coating film on the surface of the substrate to be coated. The uncured coating film is provided according to customary methods known to the skilled person, in which at least the coating formulation F is applied at the desired application rate to the substrate to be coated and then, where necessary, any volatile constituents of the coating formulation F that are present are removed. This operation is also referred to as flashing and is understood as a physical drying of the liquid coating film, so that before step ii., the only remaining constituents in the uncured coating film are essentially those which later on are not part of the completed coating.

The applying or application of the coating formulation F takes place according to methods known to the skilled person, as for example by spraying, troweling, knife coating, brushing, rolling, roller coating, pouring or nozzle application. The application rate is generally chosen such that flashing, i.e., the removal of any volatile constituents of the coating formulation F, results in an application of at least 3 g/m$^2$, e.g., 3 to 400 g/m$^2$, more particularly 3 to 200 g/m$^2$, and especially 3 to 80 g/m$^2$. With application rates of this kind, film thicknesses resulting after step iv. has been carried out are typically at least 3 μm, e.g., 3 to 400 μm, especially 3 to 200 μm, and especially 3 to 80 μm. Here it is the case that the film thickness in μm corresponds approximately to the application rate after flashing in g/m$^2$. This is the case especially for the so-called 100% systems, since these systems consist exclusively of substances which remain in the cured film, and coating formulations of this kind on curing display no significant volume contraction, meaning that the volume contraction is typically below 10 vol %.

The advantages of the method of the invention are manifested in particular in the production of thin coatings having film thicknesses of less than 20 μm. Accordingly, the method of the invention is especially suitable for producing coatings which have a film thickness in the range from 3 to <20 μm, more particularly in the range from 3 to 18 μm, and especially in the range from 5 to 16 μm. The application rate in these cases is selected, accordingly, such that flashing, i.e., the removal of any volatile constituents of the coating formulation F, results in an application of less than 20 g/m$^2$, e.g., 3 to <20 g/m$^2$, more particularly 3 to 18 g/m$^2$, and especially 5 to 16 g/m$^2$.

Suitable substrates for the method of the invention are, for example, wood, paper, including paperboard and cardboard, textile, leather, nonwoven, plastics surfaces, glass, ceramic, mineral building materials, such as molded cement blocks and fiber cement slabs, and also metals, including coated metals. The plastics surfaces are, in particular, surfaces of the following materials: polycarbonate, polyethylene, as for example PE, HDPE, LDPE, polypropylene, as for example PP, oriented PP (OPP), biaxially oriented PP (BOPP), polyamide, as for example Nylon®, polyesters, examples being polyethylene terephthalate (PET), polybutylene terephthalate (PBT), and polyethylene furanoate (PEF).

Preferred substrates are not absorbent, i.e., are not so porous that on application the coating formulation F would essentially only penetrate into the substrate. Preferred nonporous substrates are, in particular, wood, woodbase materials, plastics surfaces, glass, ceramic, and metals, including coated metals. Preferred in particular are sheetlike substrates, these being substrates which have no sharp edges or angles<150° in the surface to be coated.

The substrates may optionally be pretreated and/or precoated. For example, plastics films prior to application may be treated with corona discharges or precoated with a primer. Similarly, mineral building materials are generally provided with a primer before the coating formulation F is applied.

With particular advantage, the method of the invention can be used for the coating of wood and woodbase materials. Wood encompasses in particular the following woods: oak, spruce, pine, beech, maple, walnut, macore, chestnut, plane, robinia, ash, birch, stonepine, and elm, and also cork. Woodbase materials are, in particular, solid wood and veneered wood materials such as board plywood boards, layered plywood boards, block plywood boards, veneered plywood boards, veneered layered wood boards, veneered strip wood boards, flexural plywood, particle boards, e.g., flat pressed boards, extruded boards, oriented strand lumber (OSL) board, and laminated strand lumber, fiberboards, e.g., medium-density fiberboard (MDF), high-density fiberboard (HDF), wood fiber insulating boards (HFB), medium-hard fiberboards (MB), and hard fiberboards (HFH), wood-plastic composites, and also substrates coated with wood veneer.

In step ii., the coating film obtained in step i. is irradiated with UV light whose wavelength is situated substantially in the range from 250 nm to 420 nm, preferably substantially in the range from 300 nm to 420 nm, and especially substantially in the range from 350 to 420 nm. In this operation, some of the ethylenically unsaturated double bonds of the curable constituents in the uncured coating film undergo polymerization, and so the coating film partially cures but is not as yet through-cured. This operation is also referred to as partial gelling.

The radiation dose needed for partial gelling is generally selected such that not more than 80%, more particularly not more than 70%, and especially not more than 60%, e.g., 10 to 80%, especially 20 to 70%, and specially not more than 30 to 60%, of the ethylenically unsaturated double bonds present in the coating film undergo polymerization. The proportion of the double bonds polymerized may be determined by IR spectroscopy. The radiation dose needed for partial gelling is generally in the range from 20 to 200 mJ/cm$^2$, preferably 30 to 180 mJ/cm$^2$. Partial gelling more particularly takes place by exposure to UV radiation which features substantially radiation in the wavelength range from 350 to 420 nm, with a radiation dose in the range from 20 to 200 mJ/cm$^2$ and especially in the range from 30 to 180 mJ/cm$^2$.

The irradiation in step ii. takes place preferably in an oxygen-containing atmosphere, more particularly in an atmosphere containing at least 15 vol % of oxygen, and specifically under atmospheric conditions. Atmospheric conditions are understood to be conditions under ambient atmosphere, i.e., under air, i.e., conditions which are not inert gas conditions and/or are not an oxygen-reduced atmosphere.

Examples of radiation sources of UV light in the stated wavelength range that are employed in step ii. include UV-A emitters, e.g., fluorescent tubes, LED lamps, sold for example by Panacol-Elosol GmbH, Steinbach, Federal Republic of Germany, under the designation UV-H 254, Quick-Start UV 1200, UV-F 450, UV-P 250C, UV-P 280/6 or UV-F 900, medium-pressure or high-pressure mercury vapor lamps, in which case the mercury vapor may have been modified by doping with other elements such as gallium or iron, pulsed lamps (known by the name of UV flash light emitters), and halogen lamps. Further suitable UV emitters or lamps are described in R. Stephen Davidson, "Exploring the Science, Technology and Applications of U.V. and E.B. Curing", Sita Technology Ltd., London, 1999, Chapter I, "An Overview", page 16, FIG. 10, or by Dipl.-Ing. Peter Klamann, "eltosch System-Kompetenz, UV-Technik, Leitfaden für Anwender", page 2, October 1998.

The method of the invention in step ii. preferably uses LED emitters which permit not only precise dosing but also precise setting of the wavelength range. By this means it is possible in a targeted way to observe the conditions for the production of homogeneously matt surfaces having the desired gloss and soft touch effect.

Subsequently, in step iii., the coating obtained in step ii. is irradiated with UVC light with a wavelength in the range from 120 nm to 250 nm, preferably in the range from 150 nm to 225 nm, more preferably in the range from 150 nm to 200 nm. This produces microcreasing in the surface of the partially gelled coating film. The radiation dose employed in step iii. is in the range from 10 to 150 mJ/cm$^2$ and especially in the range from 15 to 100 mJ/cm$^2$.

The irradiation in step iii. takes place, in accordance with the invention, under an inert gas atmosphere. Inert gas atmosphere is understood to be a substantially oxygen-free atmosphere, i.e., an atmosphere containing less than 0.5 vol %, more particularly less than 0.1 vol %, and especially less than 0.05 vol % of oxygen. An inert gas atmosphere is achieved in general by flushing the area exposed to the UVC radiation with a flow of inert gas. The inert gas atmosphere firstly prevents unwanted formation of ozone and secondly avoids inhibition of polymerization of the coating film. Inert gases contemplated include, for example, nitrogen, carbon dioxide, combustion gases, helium, neon or argon. Nitrogen is used with particular preference. This nitrogen ought to contain only extremely small quantities of extraneous gases such as oxygen, for example. Purities of <500 ppm oxygen are used with preference.

Radiation sources suitable for step iii. are, in particular, excimer UV lamps, which emit UV light in the range from 120 nm to 250 nm, preferably in the range from 150 nm to 225 nm, more preferably of 172 nm.

Because the polymerization in step ii. takes place very rapidly, step iii. can generally be carried out immediately after step ii., with longer time intervals between step ii. and step iii. not being critical. The time which elapses between steps ii. and iii. is frequently just a few seconds, as for example 1 to 30 s or less, and is determined solely by relative dispositions of the irradiation equipment, and other logistical and plant-related parameters.

In step iv., the coating film obtained in step iii. is irradiated with UV radiation or with electron beams. In this procedure, the remaining fraction of the ethylenically unsaturated double bonds of the curable constituents undergo substantial or complete polymerization, and so the coating film is fully cured or through-cured. Irradiation with UV radiation is preferred. In the case of irradiation with UV radiation, the wavelength of the UV radiation is substantially in the range from 250 nm to 420 nm, preferably substantially in the range from 300 nm to 420 nm, and especially substantially in the range from 350 to 420 nm.

The radiation dose required for full curing in the case of UV radiation is generally at least 100 mJ/cm$^2$ and especially at least 150 mJ/cm$^2$. The radiation dose in step iv. is frequently in the range from 100 to 4000 mJ/cm$^2$, more particularly in the range from 150 to 2500 mJ/cm$^2$. The full curing in step iv. is accomplished in particular by irradiation with UV radiation which substantially comprises radiation in the wavelength range from 350 to 420 nm, with a radiation dose in the range from 100 to 4000 mJ/cm$^2$, more particularly in the range from 150 to 2500 mJ/cm$^2$. In the case of electron beams (150 to 300 kV), the dose customarily employed in step iv. will be from 10 to 100 kGy, preferably from 20 to 50 kGy.

For achieving a good soft touch effect it has proven advantageous if step iv. takes place using UV radiation, and the radiation dose in step iv. does not exceed a level of 700 and more particularly a level of 600, and in particular is in the range from 100 to 700 mJ/cm$^2$, especially in the range from 150 to 600 mJ/cm$^2$. These ranges for the radiation dose are valid especially when coating formulations F of groups 1, 1a, and 1b of the embodiments are employed, and more particularly in the case of those embodiments which have only feature (A) but not feature (B), and also for coating formulations F having a high level of feature (A), in the range from 4.5 to 6, for example, and/or for coating formulations whose principal constituent has a low value of feature (B), e.g., a value in the range from 1.2 to 1.4.

Where the matting takes precedence over the soft touch effect, higher radiation doses can also be employed in step iv., as for example a radiation dose in the range from 500 to 4000 mJ/cm$^2$, more particularly in the range from 600 to 2500 mJ/cm$^2$. These radiation doses are valid especially when coating formulations F having feature (D) are employed, particularly coating formulations F of the embodiments according to groups 2, 2a, and 2aa.

The irradiation in step iv. may take place under an inert gas atmosphere or in an oxygen-containing atmosphere which contains at least 15 vol % of oxygen. Step iv. takes place preferably in an oxygen-containing atmosphere which contains at least 15 vol % of oxygen, and especially under atmospheric conditions. Furthermore, irradiation may take place with the coating covered by media transparent for the radiation. Examples of such media include polymeric films. Where the irradiation in step iv. takes place by means of electron beams, preference will be given to operating under an inert gas atmosphere.

Given that the microcreasing takes somewhat longer in the case of high-viscosity coating formulations F, particularly those having a viscosity>20 Pa*s, a certain waiting time will generally be observed between steps iii. and iv. when using high-viscosity coating formulations. For coating formulations F of a viscosity lower than 20 Pa*s at maximum, the microcreasing in step iii. takes place with sufficient rapidity, and so the time interval between the implementation of steps iii. and iv. is not relevant. In general, step iv. then takes place immediately after step iii., with longer time intervals between step iii. and iv. not being critical. The time which elapsed between steps iii. and iv. is frequently just a few seconds, e.g., 1 to 30 s or less, and is determined merely by relative dispositions of the irradiation equipment and other logistical and plant-related parameters. At viscosities above 20 Pa*s it is advisable to observe a waiting time of at least 30 s, more particularly at least 60 s, between steps iii. and iv.

The radiation sources used in steps ii., iii., and iv. may be installed stationarily, so that the material for irradiation is conveyed by means of a mechanical apparatus past the radiation source, or the sources may be movable and the material to be irradiated does not change its position in accordance with preliminary gelling.

In the case of curing under atmospheric conditions, the sources may be installed stationarily, or the sources may be movable. In the case of curing under inert gas conditions, the sources are preferably in a stationary installation.

The coating obtainable in the method of the invention is typically the outermost or topmost coating. The materials coated may comprise the actual sales product, or may be part of a sales product, meaning that the coating procedure is followed by further assembly steps.

The examples which follow serve to illustrate the invention. In these examples, the following abbreviations are used:
DF double bond functionality in C=C double bonds per molecule
DPGDA dipropylene glycol diacrylate
EA epoxy acrylate
GU (degree of) gloss
GR sliding friction
HV curing method
sat. satisfactory
unsat. unsatisfactory
n.d. not determinable
MK micro-scratch resistance
MH Martens hardness
Mn number-average molecular weight
PEA polyether acrylate
PESA polyester acrylate
RH roughness
$T_o$ onset temperature of the glass transition
TBCH tert-butylcyclohexyl acrylate
TPGDA tripropylene glycol diacrylate
UA urethane acrylate Raw Materials Used:
Aliphatic polyester acrylate (1) (PESA 1); Mn=1770 g/mol; viscosity 10.5 Pas; 5 DF 4.1, $T_o$=222.65 K, network arc length 423 g/mol.
Aliphatic polyether acrylate (1) (PEA 1); Mn=1090 g/mol; viscosity 460 mPa*s; DF 2.9; $T_o$=210.65 K, network arc length 376 g/mol.
Aliphatic urethane acrylate (1) (UA 1); Mn=970 g/mol; viscosity 14.0 Pa*s; DF 7.2; $T_o$=230.45 K, network arc length 135 g/mol.
Aliphatic polyester acrylate (2) (PESA 2): Mn=860 g/mol; viscosity about 250 mPa*s; DF=3.8 C; $T_o$=214.85 K, network arc length 226 g/mol.
Aromatic epoxy acrylate (1) based on bisphenol A (EA 1) in the form of a mixture with 45 wt % of triethoxylated trimethylolpropane triacrylate; $M_n$=570 g/mol; viscosity 4.5 Pa*s; DF=2.5; $T_o$=227.95 K, network arc length 228 g/mol.
Aliphatic urethane acrylate (2) (UA 2); $M_n$=812 g/mol; viscosity 12.9 Pa*s; DF=1.9; $T_o$=222.65 K, network arc length 427 g/mol.
Aromatic epoxy acrylate based on bisphenol A (2), 75 wt % in TPGDA (EA2): Mn=520 g/mol; viscosity 14.5 Pa*s; DF=2.0; $T_o$=230.25 K, network arc length 260 g/mol.
Aliphatic polyether acrylate (2) (PEA 2); Mn=320 g/mol; viscosity 18 mPa*s; DF=2.0; $T_o$=208.15 K, network arc length 160 g/mol.
DPGDA: Mn=242 g/mol; viscosity about 8 mPa*s; DF=2.0; $T_o$=193.65 K, network arc length 121 g/mol.
TBCH: Mn=210 g/mol; viscosity about 8 mPa*s; DF=1.
Inert resin (1): Urea-formaldehyde resin with a softening range of 80 to 95° C. and a glass transition temperature of about 57° C.
Matting agent (1), silica-based: Syloid® MX 307 from W. R. Grace.
Micronized wax: Particle size $d_{50}$ 5 µm, MjuWax® from Ceronas GmbH&Co. KG.
Micronized kaolin: Particle size $d_{50}$ 2.5 µm.
Photoinitiator 1: 2,4,6-trimethylbenzoylphenylphosphinate.
Photoinitiator 2: Methyl benzoylformate (methyl phenylglyoxalate).

Analysis of the Raw Materials:

Viscosities were determined according to DIN 53019: 2008-05 using a cone-and-plate viscometer, I.C.I. Cone & Plate Viscosimeter, EIC Esprecht Instruments & Control AG, at a temperature of 23° C. and a shear rate of 10 000 s$^{-1}$ at 0-1 Pa*s, 2500 s$^{-1}$ at 1-4Pa*s, 800 s$^{-1}$ at 4-12.5 Pa*s, and 200 s$^{-1}$ at >12.5 Pa*s. The accuracy of the method is ±2% of the measurement value.

The glass transition temperature was determined using a Mettler Toledo DSC823e DSC instrument from Mettler Toledo AG in accordance with the method specified in DIN EN ISO 11357-2:2014-07 with a heating rate of 10 K min$^{-1}$. From the resulting thermogram, the onset temperature $T_o$ was determined using the software STAR$^e$ 9.1. or the instrument manufacturer. The sensor installed is the FRS 5 model with 56 thermocouples, 15 µV/mW caloric sensitivity and 330 µV/K thermal sensitivity.

The molecular weight was determined by gel permeation chromatography according to DIN 55672-1:2016-03 using polystyrene reference samples. The stationary phase used was a PLgel 3 µm MIXED-E column from Agilent Technologies. The mobile phase used was tetrahydrofuran. The samples had a concentration of about 1 g/l for an injection volume of 100 µl and a flow rate of 0.5 ml/min. Evaluation was made using a Waters RI detector and the Win GPC7 software.

The double bond density in mol C=C/kg was determined by $^1$H-NMR spectrometry against an internal standard (dimethyl terephthalate in deuterated chloroform).

The volume contraction was determined by the method of Painter & Coleman, as described in: M. M. Coleman, J. F. Graf, P C. Painter, "Specific Interactions and the Miscibility of Polymer Blends", Technomic Publishing Company, USA, 1991. The formula utilized for the computation was as follows:

$$\text{maximum contraction (\%)} = -2.58 + 3100 * (\text{functionality/molecular weight (Mn [g/mol])})$$

This formula estimates the reaction shrinkage without taking account of the density of the reactants, and can be utilized as a basis for comparison, but may deviate by up to 20% from the true FIGURE.

Production of Coating Formulations F (General Protocol)

The coating formulations F were produced by mixing the constituents indicated in the table 1 below at 23° C. in a mixing beaker. Each mixture was homogenized until it was visually clear. All of the quantities in table 1 are parts by weight. The physicochemical properties of the coating formulations are reported in table 2.

TABLE 1

Composition of the coating formulations

| Coating formulation | F1 | F2 | F3 | F4 | F5 | F6 | F7 | F8 | F9 |
|---|---|---|---|---|---|---|---|---|---|
| Constituents (parts by weight) | | | | | | | | | |
| PESA 1 | 20.0 | — | — | — | — | — | — | — | — |
| PEA 1 | 41.5 | — | — | — | — | — | — | — | — |
| UA 1 | — | 20.0 | — | — | — | — | — | — | — |
| PESA 2 | — | 41.5 | — | — | — | — | — | — | — |
| EA 1 | — | — | 60.0 | 80.0 | 60.0 | 80.0 | 100.0 | — | — |
| UA 2 | — | — | 40.0 | 20.0 | 40.0 | 20.0 | — | — | — |
| EA 2 | — | — | — | — | — | — | — | 100.0 | 95.0 |
| Inert resin | — | — | — | — | — | — | — | — | 5.0 |
| PEA 2 | 10.0 | 10.0 | — | — | — | — | — | — | — |
| DPGDA | 14.5 | 14.5 | — | — | — | — | — | — | — |
| TBCH | 10.0 | 10.0 | — | — | — | — | — | — | — |
| Matting agent | 3.0 | 3.0 | — | — | 0.75 | 0.75 | 0.75 | 0.75 | 0.75 |
| Micronized kaolin | — | — | — | — | 0.75 | 0.75 | 0.75 | 0.75 | 0.75 |
| Micronized wax | 0.3 | 0.3 | — | — | — | — | — | — | — |
| Photoinitiator 1 | 0.5 | 0.5 | 0.5 | 0.5 | 0.5 | 0.5 | 0.5 | 0.5 | 0.5 |
| Photoinitiator 2 | 0.2 | 0.2 | — | — | — | — | — | — | — |

TABLE 2

Properties of the coating formulations

| Coating formulation | F1 | F2 | F3 | F4 | F5 | F6 | F7 | F8 | F9 |
|---|---|---|---|---|---|---|---|---|---|
| Viscosity, [Pa · s] | 0.10 | 0.11 | 4.30 | 3.50 | 4.70 | 3.40 | 4.50 | 18.2 | 15.0 |
| Double bond density, [mol C=C/kg] | 3.8 | 5.6 | 3.6 | 4.1 | 3.6 | 4.1 | 4.5 | 3.8 | 3.3 |
| Volume contraction, [%] | — | — | 6.59 | 7.57 | 6.59 | 7.57 | 8.55 | 7.41 | 7.04 |
| $\beta^{1)}$, [g/K/mol] | 1.29 | 0.72 | 1.40 | 1.20 | 1.38 | 1.18 | 0.98 | 1.11 | 1.05 |

[1)] $\beta$ is the mass-average ratio $\alpha/T_o$ over all of the curable constituents present in the coating formulation, calculated using formula (2).

Production of Coatings:

Coating formulations F1-F9 above were respectively applied, unless otherwise indicated, in film thicknesses of 6 g/m2 onto Leneta b/w card (Form 2DX Brushout Cards) using a wire-wound rod, and then cured by the following methods A1, A2, B1,B2, C1, C2, or C3 by means of UV radiation.

Curing Method A1 (Not Inventive):
Step 1: Exposure to incoherent VUV radiation at 172 nm with an XIS 375×96 excimer emitter from Osram, output 185 W, irradiation power at the lamp surface 45 mW/cm², 5 cm distance from lamp surface to substrate, under nitrogen blanketing (about 500 ppm ambient residual oxygen).
Step 2: Exposure to UV radiation in the wavelength range of 200 to 450 nm, generated by a medium-pressure mercury emitter from IST Metz. The power of the emitter was adjusted such that the radiation dose on the substrate surface was 1580 mJ/cm². Irradiation took place under the ambient atmosphere.

Curing Method A2 (Not Inventive):
Method A2 was carried out as for method A1, with the power of the emitter in step 2 being set such that the radiation dose on the substrate surface was 1370 mJ/cm².

Curing Method B1 (Inventive):
Step 1: Exposure to UVA radiation at 395 nm, generated with an LED emitter from Phoseon. Exposure took place under the ambient atmosphere. The power of the emitter was set such that the radiation dose on the substrate surface was 56 mJ/cm².
Step 2: Exposure to incoherent VUV radiation at 172 nm with an XIS 375×96 excimer emitter from Osram, output 185 W, irradiation power at the lamp surface 45 mW/cm², 5 cm distance from lamp surface to substrate, under nitrogen blanketing (about 1000 ppm ambient residual oxygen).
Step 3: Exposure to UV radiation in the wavelength range of 200 to 450 nm, generated by a medium-pressure mercury emitter from IST Metz. The power of the emitter was adjusted such that the radiation dose on the substrate surface was 891 mJ/cm². Irradiation took place under the ambient atmosphere.

Curing Method B2 (Inventive):
Method B2 was carried out as for method B1, with the power of the emitter being set in step 1 such that the radiation dose on the substrate surface was 169 mJ/cm² and in step 3 the power of the emitter being set such that the radiation dose on the substrate surface was 1370 mJ/cm².

Curing Method C1 (Inventive):
Step 1: Exposure to UVA radiation at 395 nm, generated with an LED emitter from Phoseon. Exposure took place under the ambient atmosphere. The power of the emitter was set such that the radiation dose on the substrate surface was 56 mJ/cm².
Step 2: Exposure to incoherent VUV radiation at 172 nm with an XIS 375×96 excimer emitter from Osram, output 185 W, irradiation power at the lamp surface 45 mW/cm², 5 cm distance from lamp surface to substrate, under nitrogen blanketing (about 1000 ppm ambient residual oxygen).

Step 3: Exposure to UVA radiation at 395 nm, generated with an LED emitter from Phoseon. Exposure took place under the ambient atmosphere. The power of the emitter was set such that the radiation dose on the substrate surface was 453 mJ/cm².

Curing Method C2 (Inventive):

Method C2 was carried out as for method C1, with the power of the emitter in step 3 being set such that the radiation dose on the substrate surface was 360 mJ/cm².

Curing Method C3 (Inventive):

Method C3 was carried out as for method C1, with the power of the emitter in step 3 being set such that the radiation dose on the substrate surface was 235 mJ/cm².

Performance Testing:

Gloss (GU):

The gloss of the coating on the coated Leneta b/w foils was determined using a Micro-Gloss gloss meter from Byk. The gloss was determined in the direction of application at 60° (GU60) and at 85° (GU85).

Soft Touch Effect (Sliding Friction GR):

For the determination of the soft touch effect, the respective coating material was applied not to Leneta b/w card but instead to a glass plate (dimensions: 18×32 cm) and cured. The glass plate thus coated was clamped into an apparatus allowing the incident angle of the glass plate to be adjusted. A cylindrical weight weighing 1 kg (base area 20 cm²) was then placed onto the coated glass plate, the contact surface of this cylinder bearing an adhered, slip-promoting adhesive label (adhesive label from Avery; functional form 3425). The glass plate was inclined continuously with an increasing angle of incline until the weight began to slide. The angle was recorded. The angle generated by the glass plate is taken as a measure of the soft touch effect.

Martens Hardness (MH):

The Martens hardness of the coating was determined according to DIN EN ISO 14577-1 by using a Fischerscope H100 to plot a force/depth of penetration curve. For this purpose, the respective coating formulation was applied at 20 g/m² to a partially gelled 200 g/m² priming coat of the same coating material on glass, and the resulting topcoat was fully cured in accordance with the stated methods A, B1, C1, C2, or C3. (The priming coat is necessary in order to meet the DIN provisions relating to minimum film thickness.) The micro hardness was determined here by the method of instrumented penetration testing, limited by maximum force with a Vickers diamond as penetration body. According to DIN, the Martens hardness MH in this case is reported as follows: HM X/Y1/Z/Y2=result, where X=testing force [N], Y1=time of application of the testing force [s], Z1=hold time at maximum testing force [N], Y2=time of application of the testing force [s], result=Martens hardness [N/mm2].

Loss of Gloss (Micro-Scratch Resistance MK):

The loss of gloss (micro-scratch resistance) was determined according to DIN EN16094:2012-04 using a Martindale testing instrument with an applied force of 6 N, a total mass of 612±2 g and an abrasion pad diameter of 9 cm. The abrasion pad selected was a Scotchbrite pad from 3M with the designation SB7447. The substrate used was a glass plate measuring 18×32 cm to which the respective coating formulation was applied at 6 g/m2 and the resulting topcoat was fully cured in accordance with the stated methods A, B1, C1, C2, or C3. The result reported is the gloss before and after the treatment, in gloss units at 60° geometry.

Roughness (RH):

The roughness was determined by means of white light interferometry. The figure reported is the arithmetic mean roughness depth $R_a$ in μm.

White light interferometry (WLI) is a rapid optical, i.e., non-tactile 3D surface measuring technique with the greatest vertical resolution of all optical methods (resolution in the sub-nanometer range) and with a lateral resolution which is comparable with that of the majority of other optical methods with the exception of confocal microscopy. In contrast to tactile surface measurement techniques, WLI has advantages of not damaging the samples, owing to the non-contact measurement, of enabling substantially shorter measuring times to be achieved, of generating data with less noise, of being able to characterize surfaces through transparent media such as glass or polymer films, for example, and also of being designed for 3D imaging, rather than individual profile measurements. The transparent and weakly reflecting/strongly light-absorbing samples were given a vapor coating of gold prior to the measurement. The lens used was a 10X or FOV: 1.0X, and evaluation took place according to the VSI measurement method (without filters) with which the skilled person is familiar.

The Leneta foils coated were also evaluated for their appearance by means of light microscopy. This was done using a model BH2-UMA light microscope from Olympus, with an Olympus 103689 IC 50 lens.

The results of the testing of coating formulations F1 and F2 are compiled in table 3.

The results of the testing of coating formulations F3 to F9 are found in table 4.

TABLE 3

Performance testing of coating formulations F1 and F2

| Coating material | HV | GU60° | GU85° | GR [1] [°] | MH [2] [N/mm²] | MK [3] | RH [4] [μm] | Observations [5] |
|---|---|---|---|---|---|---|---|---|
| F1 | A1 | 3.0 | 2.9 | 27 | n.d. | 1.0/1.3 | 4.52 | − |
| F1 | B1 | 2.3 | 7.6 | 32 | 4.5 | 0.9/1.1 | 5.20 | + |
| F1 | C1 | 1.9 | 6.9 | 34 | 4.7 | 1.0/1.1 | 4.83 | + |
| F1 | C2 | 2.1 | 6.7 | 32 | 4.6 | 1.0/1.1 | 4.34 | + |
| F1 | C3 | 2.0 | 6.3 | 32 | 4.5 | 1.0/1.1 | 4.38 | + |
| F2 | A | 7.0 | 9.7 | 20 | n.d. | 3.4/4.4 | 3.31 | − |
| F2 | B | 5.7 | 13 | 16 | 65.6 | 2.6/4.3 | 3.98 | + |
| F2 | C1 | 5.7 | 12 | 21 | 59.4 | 2.5/5.5 | 3.96 | + |
| F2 | C2 | 5.6 | 12 | 22 | 62.1 | 2.3/4.4 | 3.72 | + |
| F2 | C3 | 5.5 | 12 | 26 | 48.8 | 2.2/4.6 | 3.40 | + |

[1] Sliding friction or soft touch effect
[2] Martens hardness: 0.2/30/30/30: HM X / Y1 / Z / Y2 = result, where X = testing force [N], Y1 = time of application of the testing force [s], Z1 = hold time at maximum testing force [N], Y2 = time of application of the testing force [s], result = Martens hardness [N/mm²]
[3] Micro-scratch resistance: gloss before and after treatment
[4] Comparison of gloss after/before at 60° angle geometry with a micro-gloss gloss meter from Byk
[5] + = surface satisfactory; − = surface unsatisfactory All formulations F1 and F2 yield homogeneous, matt surfaces after the curing methods (B1), (C1), (C2), and (C3) according to the invention. The matting of the surfaces of the invention exhibits little fluctuation between the curing methods (B1), (C1), (C2), and (C3) within the limits of the error tolerance of the measurement method. The tactility of the surface F2 differs dependent on the curing method and on the curing energy applied in the final cure. The lower the curing energy, the softer and more velvety the surface effect, without significant influence on gloss, the high resistance, or hardness. The soft touch coating F1, which is soft in any case, exhibits hardly any influence by the curing technology on the soft touch effect, which is generally already at a very high level. Here again there is no significant influence on the gloss, the high resistance, or hardness.

Within limits, the soft touch effect can also be described via the roughness and structuring of the surface. Formula F1 generally exhibits somewhat higher values for the arithmetic mean roughness $RH_a$ relative to formulation F2. After the inventive processes (B) and (C), all films show similar structuring of the surface close to a normal distribution, without significant outliers in the asymmetry (skewness) and curvature (kurtosis), suggesting that the different tactile feedback can be explained solely by the roughness and coating chemistry.

In both coating materials F1 and F2, curing in line with the comparative process (A1) leads to inhomogeneous surfaces (frost appearance) with a relatively high gloss and without soft touch effect.

TABLE 4

Performance testing of coating formulations F3 to F9

| Coating material | HV | GU60° | GU85° | $RH_a$ [μm] | Observations |
|---|---|---|---|---|---|
| F3 | A2 | 9.0 | 12.1 | 6.46 | Surface unsat.: inhomogeneous, severe lumping |
| F3 | B2 | 10.3 | 23.6 | 4.38 | Surface sat.: homogeneous but rough structuring |
| F4 | A2 | 14.3 | 22.1 | 3.94 | Surface unsat.: inhomogeneous, severe lumping |
| F4 | B2 | 17.4 | 39.5 | 2.84 | Surface sat.: homogeneous, but rough structuring |
| F5 | A2 | 6.5 | 7.2 | 6.71 | Surface unsat.: inhomogeneous, slight lumping |
| F5 | B2 | 6.7 | 8.1 | 5.54 | Surface sat.: homogeneous, fine structuring |
| F6 | A2 | 15.3 | 19.8 | 4.03 | Surface unsat.: inhomogeneous, slight lumping |
| F6 | B2 | 13.4 | 34.3 | 2.84 | Surface sat.: homogeneous, fine structuring |
| F7 | B2 | 21.8 | 71.5 | 1.66 | Surface sat.: homogeneous, fine structuring |
| F8 | B2 | 32.0 | 77.6 | 1.26 | Surface sat.: homogeneous, fine structuring |
| F9 | B2 | 63.8 | 93.8 | 0.74 | Surface sat.: homogeneous, fine structuring |

The coatings produced using the coating formulations F3 to F9 after the curing method B2 all exhibit homogeneous surfaces with more (F5-F9) or less (F3, F4) fine structuring without the formation of a frostlike structure. Depending on the choice of raw materials, the degree of matting of the formulations cured by method (B2) can be controlled. The influencing variable here in particular is the fraction of aromatic epoxy acrylate. The greater the fraction of epoxy acrylate, the higher the gloss becomes. Parameters such as double bond density, the theoretical reaction shrinkage and the viscosity of the formulation also play a part. The higher the double bond density and the viscosity, and/or the lower the theoretical reaction shrinkage, the greater the resultant gloss. The key element in the establishment of the gloss, however, is the fraction of the aromatic epoxy acrylate. The homogeneity of the coating is adjusted preferably by compensating measures, such as the use of additional matting agent, in order to reduce the risk of a coarser structuring.

The invention claimed is:

1. A method for producing matt coatings on sheetlike substrates, comprising the consecutive steps i.-iv.,
    i. providing an uncured coating film of a liquid coating formulation F, curable by UV radiation, on the surface of the substrate to be coated;
    ii. irradiating the coating film with UV radiation which lies substantially in the wavelength range from 250 to 420 nm, with a radiation dose which leads to partial curing of the coating film;
    iii. irradiating the partially cured coating film with UV radiation in the wavelength range from 150 to <250 nm under inert gas;
    iv. irradiating the partially cured coating film with UV radiation which lies substantially in the wavelength range from 250 to 420 nm, or with electron beams, with a radiation dose which leads to full curing of the coating film;
    wherein the coating formulation F comprises at least 80 wt %, based on the total weight of the coating-forming constituents of the coating formulation F, of one or more curable constituents which have ethylenically unsaturated double bonds,
    the coating formulation F further comprising at least one photoinitiator, wherein the coating formulation F comprises at least one oligomer or polymer which carries on average at least 1.5 ethylenic double bonds per molecule and has a number-average molecular weight $M_n$ of at least 450 daltons, and
    the coating formulation F fulfills at least the following features (A) and (B) or (A) and (C) and optionally (D):
    (A) the number of ethylenically unsaturated double bonds, based on the coating-forming constituents present in the coating formulation F, is in the range from 3.0 to 8.0 mol/kg;
    (B) the coating formulation F comprises at least 30 wt %, based on the curable constituents present therein, of an oligomer or polymer or of a mixture of oligomers and/or polymers wherein the ratio $\alpha/T_o$ of calculated network arc length $\alpha$ in g/mol to the onset temperature $T_o$ in kelvins of the glass transition, determined by means of differential scanning calorimetry according to DIN EN ISO 11357-2:2014, is at least 1.2;
    (C) the mass-average ratio $\alpha/T_o$, averaged over the weight fractions of all curable constituents of the coating formulation F, is at least 1.0;
    (D) the coating formulation F comprises at least one aromatic epoxy acrylate in an amount of at least 20 wt %, based on the total weight of the curable constituents present in the coating formulation F.

2. The method according to claim 1, wherein the irradiation in step ii. takes place with UV radiation with a radiation dose in the range from 20 to 200 mJ/cm², the UV radiation lying substantially in the wavelength range from 350 to 420 nm.

3. The method according to claim 1, wherein the irradiation in step ii. takes place under an oxygen-containing atmosphere.

4. The method according to claim 1, wherein the irradiation in step iii. takes place in the wavelength range from 150 to 230 nm.

5. The method according to claim 1, wherein the irradiation in step iv. takes place with UV radiation which lies substantially in the wavelength range from 350 to 420 nm.

6. The method according to claim 1, wherein the coating formulation F is a nonaqueous coating formulation which comprises at least 80 wt %, based on the total weight of the coating formulation F, of one or more constituents which have ethylenically unsaturated double bonds.

7. The method according to claim 1, wherein the coating formulation F is applied to the surface of the substrate to be coated, in an amount such that, after curing, the resulting film thickness is from 3 to <20 μm, more particularly from 3 to 15 μm.

8. The method according to claim 1, wherein, in the coating formulation F, the ethylenically unsaturated double bonds of the constituents present therein are present to an extent of at least 90 mol %, based on the total amount of the ethylenically unsaturated double bonds present in the composition, in the form of acrylate groups.

9. The method according to claim 1, wherein the coating formulation F comprises as principal constituent at least one oligomer selected from aliphatic urethane (meth)acrylates, aliphatic polyether (meth)acrylates, aliphatic polyester (meth)acrylates, aliphatic polycarbonate (meth)acrylates, and mixtures thereof.

10. The method according to claim 1, wherein the coating formulation F further comprises at least one monomer which carries on average 1 to 3 ethylenic double bonds per molecule and has a number-average molecular weight $M_n$<450 daltons.

11. The method according to claim 1, wherein the irradiation in step iv. takes place with a radiation dose in the range from 150 to 600 mJ/cm$^2$.

12. The method according to claim 1, wherein the coating formulation F fulfills feature (D).

13. The method according to claim 12, wherein the aromatic epoxy acrylate is selected from the reaction products of aromatic glycidyl ethers with hydroxyalkyl acrylates and/or acrylic acid.

14. The method according to claim 12, wherein the coating formulation F comprises at least one additive selected from matting agents, waxes, and inert resins.

15. The method according to claim 1, wherein the coating formulation F comprises at least one photoinitiator which has at least one absorption band having a maximum $\lambda_{max}$ in the range from 340 to 420 nm.

16. The method according to claim 15, wherein the coating formulation F further comprises at least one photoinitiator which has at least one absorption band having a maximum $\lambda_{max}$ in the range from 220 to 340 nm.

17. The method according to claim 15, wherein the photoinitiator has at least one absorption band having a maximum $\lambda_{max}$ in the range from 350 to 410 nm.

18. The method according to claim 16, wherein the photoinitiator has at least one absorption band having a maximum $\lambda_{max}$ in the range from 230 to 320 nm.

19. The method according to claim 1, wherein the substrate to be coated is a sheetlike, nonporous substrate.

* * * * *